(12) United States Patent
Yost

(10) Patent No.: US 11,698,711 B2
(45) Date of Patent: *Jul. 11, 2023

(54) COMPUTER SYSTEM WITH A PLURALITY OF WORK ENVIRONMENTS WHERE EACH WORK ENVIRONMENT AFFORDS ONE OR MORE WORKSPACES

(71) Applicant: David Arthur Yost, Los Altos, CA (US)

(72) Inventor: David Arthur Yost, Los Altos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/404,583

(22) Filed: Aug. 17, 2021

(65) Prior Publication Data

US 2022/0035511 A1 Feb. 3, 2022

Related U.S. Application Data

(63) Continuation of application No. 16/807,041, filed on Mar. 2, 2020, now Pat. No. 11,137,877, which is a
(Continued)

(51) Int. Cl.
*G06Q 30/02* (2023.01)
*G06F 9/445* (2018.01)
(Continued)

(52) U.S. Cl.
CPC ........ *G06F 3/04817* (2013.01); *G06F 3/0482* (2013.01); *G06F 9/5016* (2013.01); *G06F 16/185* (2019.01); *G06F 21/53* (2013.01)

(58) Field of Classification Search
CPC .. G06F 3/04817; G06F 16/185; G06F 3/0482; G06F 9/5016; G06F 21/53
See application file for complete search history.

(56) References Cited

U.S. PATENT DOCUMENTS 8,762,326 B1 6/2014 Zhou et al.
9,275,001 B1 3/2016 Liebald et al.
(Continued)

OTHER PUBLICATIONS

Deng et al., The Prediction of User Topic Interest Based on Tags and Interaction of Users, 7 pages (Year: 2016).*
(Continued)

*Primary Examiner* — Thuy Dao
(74) *Attorney, Agent, or Firm* — Appleton Luff

(57) ABSTRACT

A computer system provides at least one workspace as a user interface corresponding to a user-generated topic. A home topic is provided to the user as an initially selected topic. The home topic provides a workspace to the user as a user interface. User selection of a first topic within the home topic causes designation of the first topic as the current topic. A first workspace is associated with the first topic, and a first topic data structure associated with the first topic is generated and the first topic data structure is associated only with application windows, files and application related data used by the user while the first topic is designated as the current topic. The user is provided, within the first workspace, only application windows, files and application related data used by the user while the first topic is designated as the current topic.

4 Claims, 29 Drawing Sheets

Related U.S. Application Data continuation of application No. 16/213,643, filed on Dec. 7, 2018, now Pat. No. 10,606,446.

(60) Provisional application No. 62/768,909, filed on Nov. 17, 2018, provisional application No. 62/666,702, filed on May 4, 2018.

(51) Int. Cl.
    *G06F 16/95*     (2019.01)
    *G06F 9/455*     (2018.01)
    *G06F 3/04817*     (2022.01)
    *G06F 3/0482*     (2013.01)
    *G06F 16/185*     (2019.01)
    *G06F 21/53*     (2013.01)
    *G06F 9/50*     (2006.01)

(56) References Cited

U.S. PATENT DOCUMENTS

| | | |
|---|---|---|
| 9,317,468 B2 | 4/2016 | Liebald et al. |
| 9,424,359 B1 | 8/2016 | Hamadani et al. |
| 10,592,927 B2 * | 3/2020 | Cheng ................. G06F 16/9535 |
| 2010/0269158 A1 | 10/2010 | Ehler et al. |
| 2011/0126132 A1 | 5/2011 | Anderson et al. |
| 2011/0225232 A1 | 9/2011 | Casalaina et al. |
| 2011/0270830 A1 | 11/2011 | Stefik et al. |
| 2012/0216122 A1 | 8/2012 | Wong et al. |
| 2012/0296974 A1 | 11/2012 | Tabe |
| 2013/0073970 A1 | 3/2013 | Piantino et al. |
| 2014/0236953 A1 | 8/2014 | Rapaport et al. |
| 2014/0298201 A1 | 10/2014 | Tsui et al. |
| 2015/0104003 A1 | 4/2015 | Holman et al. |
| 2015/0382147 A1 | 12/2015 | Clark et al. |
| 2016/0085388 A1 | 3/2016 | Fang et al. |
| 2016/0283085 A1 | 9/2016 | Beausoleil et al. |
| 2016/0366088 A1 | 12/2016 | Mahmoud et al. |
| 2018/0183748 A1 | 6/2018 | Zhang et al. |
| 2018/0357728 A1 | 12/2018 | Huening et al. |

OTHER PUBLICATIONS

Chen et al., People Opinion Topic Model: Opinion based User Clustering in Social Networks, 7 pages (Year: 2017).

How to Use Linux Style Virtual Workspaces in Windows 10, lifewire.com, updated Nov. 7, 2018.

How to use Linux's virtual desktops and workspaces, PCWorld, Chris Hoffman, Mar. 9, 2015.

International Search Report, International Application No. PCT/US 19/30817.

Kim et al., TopicSifter: Interactive Search Space Reduction through Targeted Topic Modeling, 11 pages (2019).

Leopard Sneak Peak, Internet Archive, on the Wayback Machine, http://www.apple.com/macosx/leopard/features/spaces.html, Jul. 10, 2007.

Multiple desktop support in Windows, Microsoft Developer, Jul. 5, 2006.

PCT/US/19/30817: Written Opinion of the International Searching Authority.

Road to Mac Os X Leopard: Spaces, Prince McLean, Appleinsider. com, Oct. 11, 2007.

Rooms: the use of multiple virtual workspaces to reduce space contention in a window-based graphical user interface, Henderson, D. A.; Card, S. K. ACM Transactions on Graphics. Jul. 1986; 5 (3): 211-243.

Spaces: A look at Apple's take on virtual desktops Macworld on the Wayback Machine, http://web.archive.org, Oct. 22, 2007.

Spaces: Apple's take on virtual desktops in Leopard, Computerworld, Ryan Fass, Nov. 22, 2006.

* cited by examiner

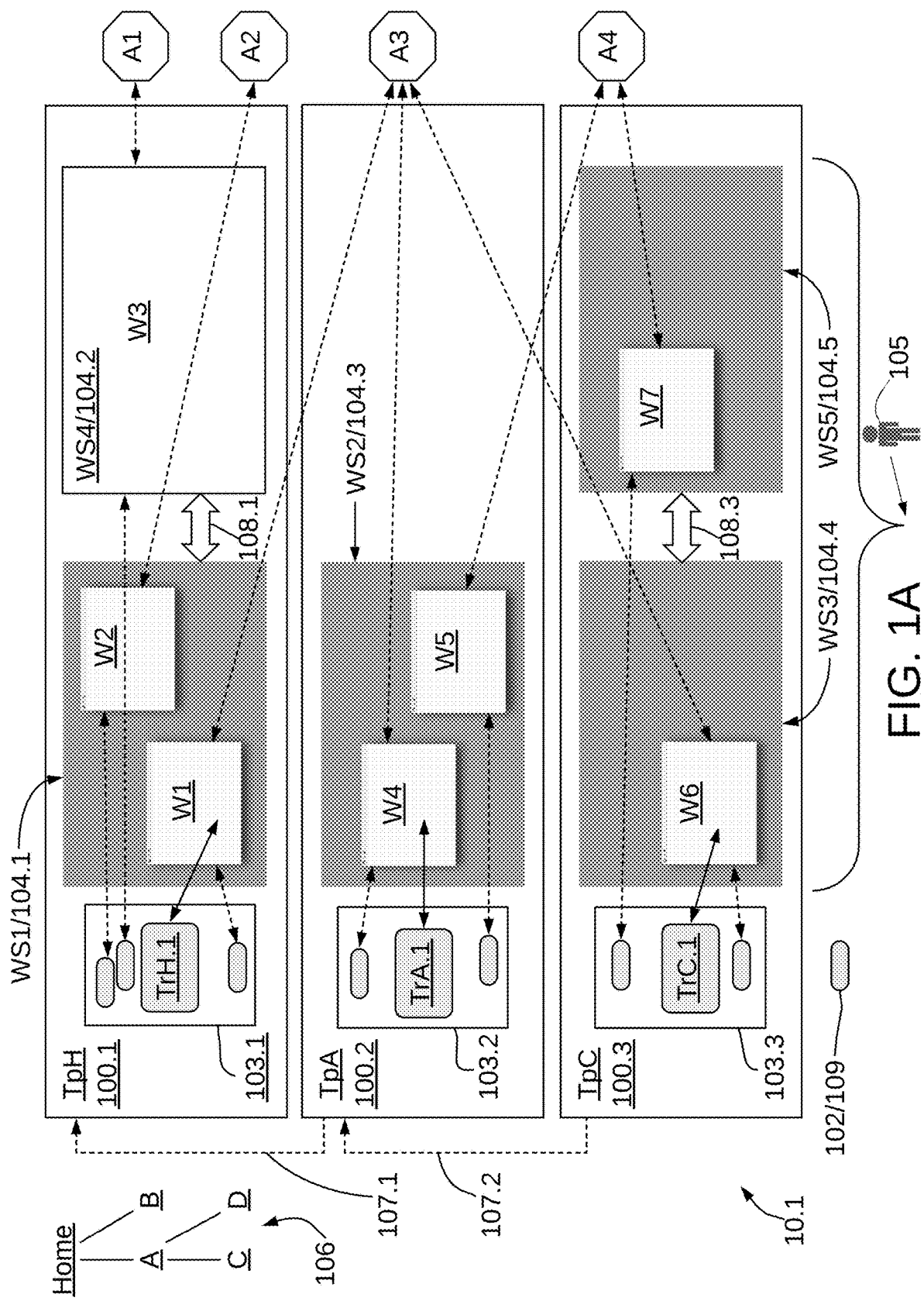

Terms
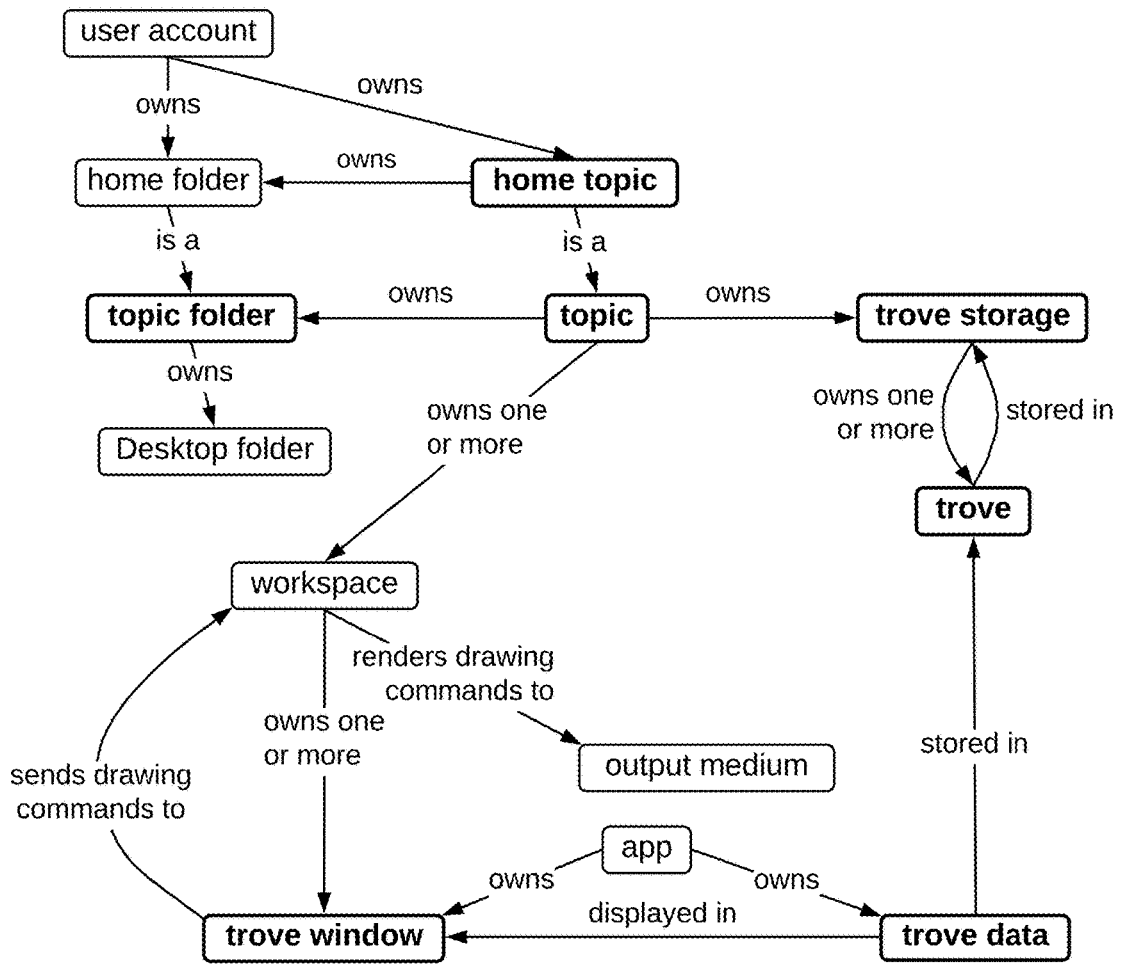
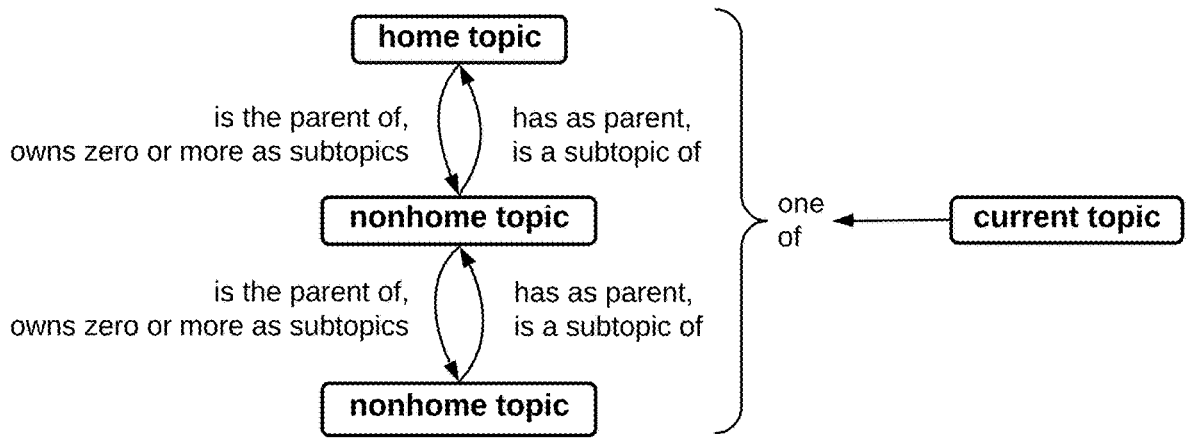
FIG. 1B

Creation of topic 100.1

Allocate trove storage 103.1 and associate it with 100.1
501

Designate a folder as the topic folder associated with 100.1
502

Create a first workspace 104.1, associate it with 100.1, and designate 104.1 as the current workspace of 100.1
503

Create a Desktop folder and associate it with 100.1
504

Place an alias file referencing the topic folder in the Deskop folder
505

Designate 100.1 as the current topic
506

FIG. 5

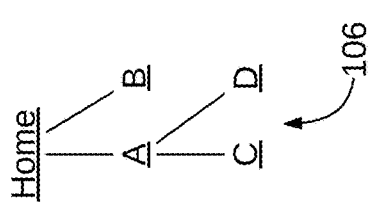

FIG. 9B

| | | Current Topic: C | |
|---|---|---|---|
| | | Topic Bar selections | Trove data displayed |
| inclusive | 1 | Home A C | h a b c d |
| | 2 | Home A C | a c d |
| | 3 | Home A C | c |
| | 4 | Home A C | h a c |
| exclusive | 5 | Home A C | h a |
| | 6 | Home A C | h c |
| | 7 | Home A C | h |
| | 8 | Home A C | a c |
| | 9 | Home A C | a |
| | 10 | Home A C | c |
| | 11 | Home A C | |

FIG. 9C

| | | Current Topic: A | |
|---|---|---|---|
| | | Topic Bar selections | Trove data displayed |
| inclusive | 1 | Home A | h a b c d |
| | 2 | Home A | a c d |
| | 3 | Home A sub | h a c d |
| | 4 | Home A sub | h a |
| exclusive | 5 | Home A sub | h c d |
| | 6 | Home A sub | h |
| | 7 | Home A sub | a c d |
| | 8 | Home A sub | a |
| | 9 | Home A sub | c d |
| | 10 | Home A sub | |

FIG. 9A

| | Current topic | Trove data displayed |
|---|---|---|
| 1 | Home | h a b c d |
| 2 | A | a c d |
| 3 | B | b |
| 4 | C | c |
| 5 | D | d |

FIG. 9D

| | Private | Current topic | Trove data displayed |
|---|---|---|---|
| 1 | | Home | h b |
| 2 | ✓ | A | a c d |
| 3 | | B | b |
| 4 | | C | c |
| 5 | | D | d |

COMPUTER SYSTEM WITH A PLURALITY OF WORK ENVIRONMENTS WHERE EACH WORK ENVIRONMENT AFFORDS ONE OR MORE WORKSPACES

RELATED APPLICATIONS

This application is a continuation of U.S. patent application Ser. No. 16/807,041 filed on Mar. 2, 2020, which application is a continuation of U.S. patent application Ser. No. 16/213,643 filed on Dec. 7, 2018 and issued as U.S. Pat. No. 10,606,446, which application claims priority to provisional patent application 62/666,702 filed on May 4, 2018 and provisional patent application 62/768,909 filed on Nov. 17, 2018

FIELD OF THE DISCLOSURE

This disclosure relates generally to computerized information systems and more particularly to facilitating usage of such systems.

BACKGROUND

Users are increasingly using computer systems for a greater number of tasks. It is not uncommon for a user to have open on their computer at one time several applications when working on a single project. For example, the user may be using (i) a browser to perform World Wide Web (WWW) searches and access web-based applications; (ii) a word processor to generate documents comprising text, graphs, images and video; (iii) a spreadsheet to manipulate data; (iv) an email system to exchange email messages with others; and (v) a Short-Message-System (SMS) application to exchange SMS messages with others. In addition to the above, many users are required to work on multiple projects. When working on a second project, some users prefer to close or hide any document windows and applications associated with the first project to avoid confusion and unwanted data exchange with the second project. While this approach maintains separation between projects it requires discipline and time and may not be practical for many users who must switch quickly between projects during a workday. Other users may leave open the document windows and applications associated with the first project. This is likely the more common scenario for many users and results in clutter, which can lead to confusion, additional work and possible intermingling of information between projects. A user may have open a web browser with tabs or windows containing search results and applications for multiple projects, a word processor with documents for multiple projects, an email program with emails for multiple projects, etc.

A partial solution to the increasing amount of information consumed by computer users, as described above, has been to use larger computer monitors to permit a larger amount of information to be displayed at one time. Another related solution has been to employ multiple monitors.

Other solutions, include virtual monitors, sometimes referred to as workspaces, such as the Spaces feature of macOS® by Apple Inc or the Virtual Desktops feature of Windows® by Microsoft Corporation, which derive from a 1986 paper from Xerox Palo Alto Research Center, Intelligent Systems Laboratory (Henderson, D. A.; Card, S. K. Rooms: the use of multiple virtual workspaces to reduce space contention in a window-based graphical user interface ACM Transactions on Graphics. 1986 July; 5 (3): 211-243). These solutions attempt to achieve with virtual monitor software the increased screen space achieved by larger or multiple monitors, by permitting the user to move easily between what appear to be different monitors showing different sets of windows within the same user login session. For example, a user may create and use a workspace for office work, enabling a work-related application (such as a word processor or spreadsheet window) to occupy the full monitor, and then may switch to a different workspace created for browsing the Internet or exchanging email messages.

While the aforementioned hardware and software-based solutions facilitate increased consumption of information and computing resources, there remains a need for improved computer systems that support and facilitate the increased needs of computer users for better control over and isolation between their work on multiple projects.

SUMMARY

The embodiments disclosed herein simplify usage of computer systems by providing one or more topics to a user. Generally speaking, to summarize, a topic, which is specifically defined below, may take the form of a work environment that is a user interface comprising only the window(s), file(s) and application related data that are associated with a current topic. So, for a particular current topic selected by the user, the user sees only the application windows, and in certain embodiments, desktop icons, associated with the current topic. In addition, the application related data associated with the topic, such as browser history, application settings, and data managed implicitly by the applications (as opposed to managed explicitly by the user), such as email, or pictures, is also associated with the topic and made available while the topic is selected. Moreover, in certain embodiments, searches for data from within a topic may provide only data associated with that topic. The embodiments disclosed herein allow the user to create and switch between multiple topics providing isolation that is in many cases better suited to users' needs than the isolation provided by conventional workspaces. In other embodiments, topics span multiple devices so that a topic selected and used on one device, such as a laptop computer, may also be seen and used on another device such as a mobile phone. To aid in the use of multiple topics, the embodiments disclosed herein include features to facilitate working with data from more than one topic at once and for sharing selectively the preferences appropriate to different topics.

Additional aspects related to the invention will be set forth in part in the description that follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification exemplify the embodiments of the present invention and, together with the description, serve to explain and illustrate principles of the inventive techniques. Elements designated with reference numbers ending in a suffix such as 0.1, 0.2, 0.3 are referred to collectively by employing the main reference number without the suffix. For example, 100 refers to topics 100.1, 100.2, 100.3 generally and collectively.

FIG. 1A provides high level overview to explain the operation of a computer system employing topics.

FIG. 1B is a chart showing relationships between the terms introduced in connection with FIG. 1A and described further herein.

FIG. 5 is a flow diagram illustrating creation of a new topic.

FIGS. 9A, 9B, 9C and 9D illustrate topic inclusion.

DETAILED DESCRIPTION

Figure 2:
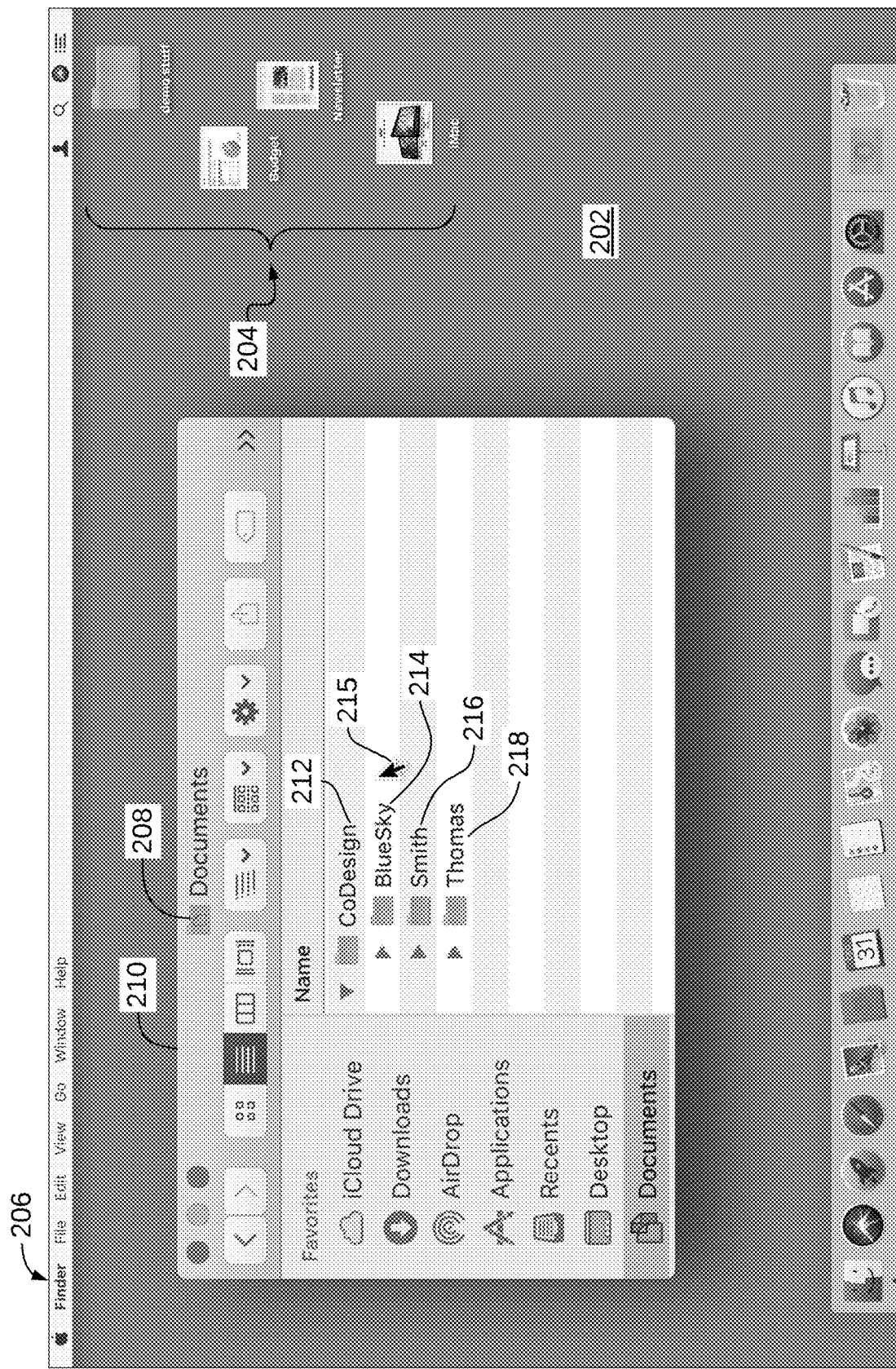
FIGS. 2, 3, 4 and 6, are screenshots illustrating usage of an embodiment of a computer system implementing topics.
Figure 3:
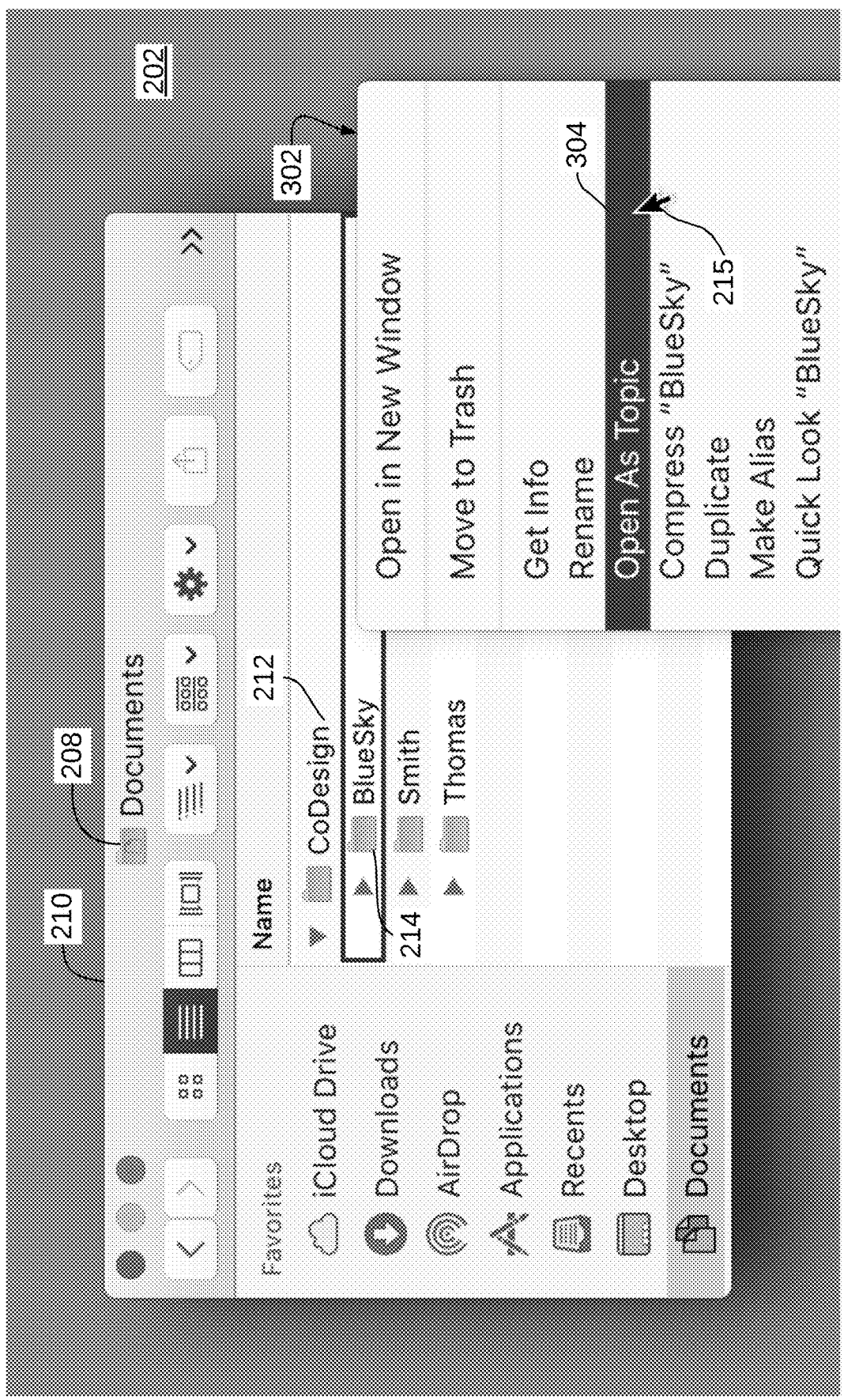
Figure 4:
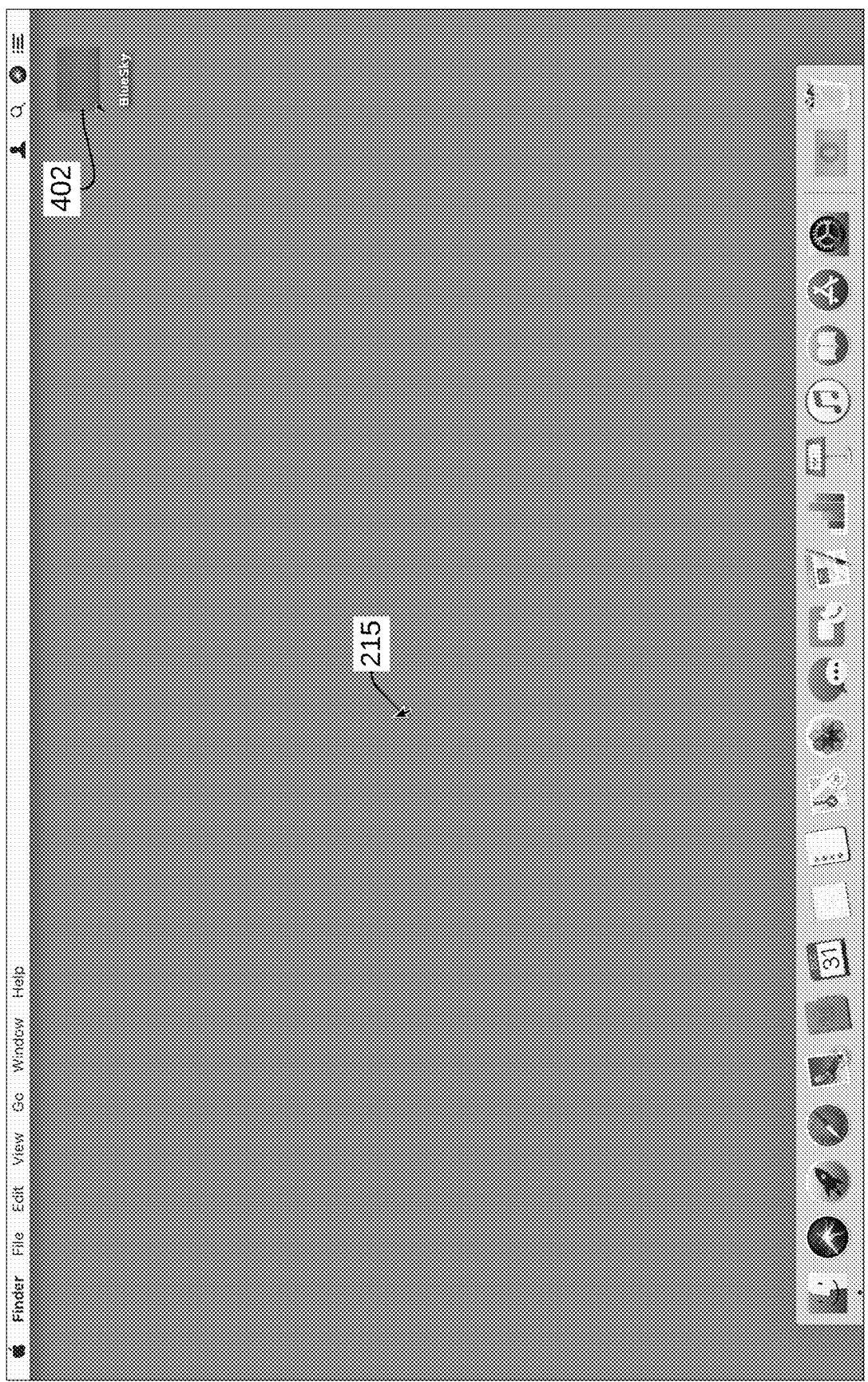

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Disclosed herein are various embodiments of a computer system that provides beyond a default, system-generated home topic, additional user-generated topics. Applications, files and application related data are stored in a data storage associated with the computer system. In certain embodiments, a processor is configured to execute instructions that when executed cause the processor to provide to the user, who is logged in, and thereby identified to the system, a home topic that corresponds to a first user account. The home topic provides a user interface while the user is logged into the first user account. Certain computer systems provide for explicit user account(s), where each user account provides to a user a home topic comprising certain capabilities. Systems that do not provide explicit user accounts provide an implicit single user account for any user. The term "user account" as used herein refers to the aforementioned explicit and implicit user accounts. In some embodiments a system requires a user to take authentication steps before the system will allow the user to access the system.

At all times one of the user's topics is the current topic. The system may operate to designate the home topic by default as a current topic provided to the user. The system responds to user selection of a first topic other than the home topic, by designating the first topic as the current topic provided to the user. The system also generates for persistent storage in the data storage, a first topic data structure associated with the first topic. The system stores with the first topic data structure, troves containing trove data relating to application windows, files and application related data used by the user while the first topic is designated as the current topic. As will be appreciated by those skilled in the art in view of the present disclosure, an application window is an instance of a window generated by an application. The system provides to the user within the isolated first topic, as the user interface, only application windows, files and application related data used by the user while the first topic is designated as the current topic. The system responds to subsequent user selection of the first topic by designating the first topic as the current topic provided to the user and restoring the first topic by retrieving one or more portions of the first topic data structure from the data storage. The system also provides to the user, in response to one or more user inputs, the isolated first topic as the user interface in which only application windows, files and application related data used by the application windows while the first topic is designated as the current topic, are displayed to the user. In certain embodiments, the user may via various interfaces, which may be partially or fully automated, designate application windows, files and application related data to be associated with a particular topic. In certain embodiments, a topic can comprise multiple workspaces, and all workspaces within a particular topic have a shared set of desktop icons in the background, and by default, share the same background graphic.

For simplicity of explanation, the following description provides an explanation of various embodiments in the context of a single example operating system, specifically the macOS® operating system available from Apple Inc. Those skilled in the art will appreciate that the disclosed embodiments may be implemented within the context of other operating systems such as the Windows® operating system available from Microsoft Corp., Chrome OS™ available from Google LLC, or UNIX/XWindow-derivative operating systems such as Linux®. The disclosed embodiments may also be implemented in the context of operating systems directed specifically to mobile devices such as the iOS® operating system from Apple Inc. or the Android® operating system from Google LLC, among others.

The terms set forth below, as used in capitalized or uncapitalized forms, should be interpreted to have the following meanings:

Topic—a work environment that includes a user interface comprising one or more workspaces, relationships to other topics in a topic tree (described below), and associated storage for troves. A topic may be open or closed. A topic contains one current workspace and may contain other workspaces. An example of a topic may be seen at reference number 100 in the drawings.

Workspace—an object representing the collection of application (or application program, or app) windows and system windows and background that are displayed when the workspace is active on an output medium. When an app renders a graphical command for the user, the target of the command is a window in a workspace. A workspace may be open or closed. If a workspace is open it may be visible on a physical monitor, it may be visible in a window of a virtual display app, or it may be invisible. If a workspace is closed its contents are not visible to the user. Data used in managing a workspace, its windows, and other images such as the desktop and icons on the desktop, are stored in a trove. When a workspace is visible, the workspace and its topic are open. An example of a workspace may be seen at reference number 104 in the drawings.

Output medium—a physical display monitor (one or more), or one or more virtual emulation(s) of a display monitor. An example of a virtual emulation of a display monitor is a window provided by a virtual machine desktop application such as VMware Desktop or a remote desktop screen sharing application compatible with Virtual Network Computing (VNC), an industry standard for controlling computers remotely on a network using TCP/IP.

Full-workspace mode—a state of an application window in which the window covers an entire workspace. Another common term of art for full-workspace mode is full-screen mode.

Trove—a storage container used by an app or by the system for data that the app or the system stores implicitly for use while the trove's owning topic is the current topic, as for example data and metadata for workspaces, window positions, user preferences, browser bookmarks or history, notes, photos, and emails. Trove data is distinguished from document data that is placed somewhere explicitly by a user via a user interface (UI) save dialog. An example of a trove may be seen at reference number 102 in the drawings, with a special case being seen at 109.

Trove data—data that is stored in a trove.

Trove storage—a collection of troves owned by a topic. Trove storage may be in a folder contained by a topic folder or may be stored somewhere else. An example of trove storage may be seen at reference number 103 in the drawings.

Trove window—a window whose primary purpose is to display trove data.

Document window—a window that displays data from a document file.

Topic folder—a folder whose subsumed hierarchy of files and folders can be used to store data pertaining to a topic, such as files and troves. Example: In an embodiment employing macOS®, a topic folder would contain subfolders such as the Library folder, which if modified in accordance with embodiments disclosed herein would contain troves.

Home folder—a folder that is designated as the root of a folder hierarchy to be used for a user login session. Typically, a home folder is the topic folder owned by a home topic.

Home topic—the topic at the root of a topic tree. In some embodiments, a home topic is associated with a home folder.

Nonhome topic—a topic that is not the home topic.

Topic tree—a hierarchy of topics. Starting from the home topic, which is the root of a topic tree, each topic is a parent topic to zero or more subtopics, also referred to as child topics. Each nonhome topic has a parent topic, of which the nonhome topic is a subtopic. Following normal terminology for hierarchies, all ancestors of a topic are reached recursively via parent topic lineal relationships, and all descendants of a topic are reached recursively via subtopic lineal relationships. An example of a topic tree may be seen at reference number 106 in the drawings. An embodiment may provide a more general structure than a tree, for example a directed graph, where the term subtopic refers to a topic in a subordinate relationship.

Desktop folder—a folder contained within the topic folder hierarchy whose contents are displayed in the background layer of a workspace.

Current topic—a topic selected by a user, the current workspace of which is displayed on an output medium. At all times one of the user's topics is the current topic for the output medium. When a first topic is the current topic, we sometimes say that the user "is in" the first topic.

Topics panel—a graphical object that shows representations, such as thumbnails or names, of topics. An example of a topics panel may be seen at reference number 602 in the drawings. In embodiments disclosed herein, a topics panel 602 allows the user to open topics, to close topics, to select a topic to be the current topic, to create workspaces for a topic, and to select the current workspace for a topic.

FIG. 1A provides a high-level overview to explain the operation of a computer system 10.1 employing topics as further disclosed herein. Hardware and software portions of the computer system 10.1, and methods performed by the computer system 10.1, are described in further detail herein, and the computer system 10.1 may be configured, via hardware and software to perform the functions and to implement the features described herein to improve operation of the computer system 10.1 by facilitating user interaction with and operation of the computer system 10.1. Computer system 10.1 includes a processor, storage, output media and associated hardware and software, which are explained in further detail in connection with FIG. 17.

In FIG. 1A a plurality of topics 100 are seen, with each topic 100 having a corresponding set of workspaces 104. Topic 100.1 labeled 'TpH' is a home topic, i.e. it corresponds to a top-level folder. In the context of the macOS® environment, the home topic 100.1 may correspond to the folder in macOS® typically known as the 'Home' folder. In such an embodiment, topic 100.1 is associated with the folder labeled Home. The topic hierarchy relationship is seen at 106, which also illustrates the relationship of topic folders associated with the topics. The Home topic has associated with it subtopics A and B, which have a subordinate relationship to the Home topic. Topics C and D are subtopics of topic A. Topics Home, A and C are represented at right as TpH (100.1), TpA (100.2) and TpC (100.3). Topics associated with topics B and D are not shown in FIG. 1A, for simplicity of illustration. Each topic 100 is associated with one or more workspaces 104. In certain embodiments, the folders and the workspaces 104 may both take a standard form such as provided by macOS® by way of its folders and Spaces® features.

The workspaces 104, as implemented in macOS®, such as in Apple's 10.14 macOS® operating system, and known there as 'Spaces', provide a form of a virtual desktop in which multiple workspaces may be created by a user 105 with each workspace typically containing one or more windows in addition to a desktop background (not shown).

For example, user 105 may use one workspace for a word processing program that consumes the entire workspace, the user may use another workspace for a spreadsheet window and a Finder window with each application consuming approximately half of the workspace, and the user may assign a third workspace to show the user's desktop not obscured by any windows. Workspace 104.2 is an example of an application in full-workspace mode. The Spaces® feature permits easier organization of a user's workflow. Application windows may be parceled out into workspaces instead of being crammed into a single workspace where they are layered on top or one another and continually minimized or obscured and then called back into action.

In some embodiments, each topic 100 has associated with it a set of standard folders (Desktop, Library, etc.) (not shown). Each workspace 104 is owned by either the home folder or with some other topic folder. In FIG. 1A, the arrows show two workspaces WS1 (104.1) and WS4 (104.2) associated with the home topic. Each workspace 104 has associated with it one or more windows (W). For example, workspace WS1 (104.1) is configured to display two windows, W1 and W2 when selected by the user 105. Workspace WS4 (104.2) is configured to display a single window W3 in the full-workspace mode. Workspace WS2 (104.3) is configured to display two windows, W4 and W5. Workspace WS3 (104.4) is configured to display a single window W6 in a portion of the workspace 104.4, and workspace WS5 (104.5) is similarly configured to display a single window W7 in a portion of the workspace 104.5. In a typical configuration, a workspace 104 will consume an entire output medium used by the user 105. In other configurations, the computer system 10.1 may employ multiple output media and a workspace 104 may consume all of the output media or a subset of the output media, as designated by the user 105. In certain embodiments, the user may arrange computer system 10.1 to cause a workspace 104 to consume a portion of an output medium.

In general, the user 105 is identified to the computer system 10.1, such as by logging into an account provided by the computer system 10.1. This permits the computer system 10.1 to retrieve topics 100 from persistent storage associated with user 105 to provide the user 105 with topics and associated workspaces and windows from one or more prior interactions by the user 105 with the computer system 10.1. The computer system 10.1 may support multiple users by providing an account to each user and in such an event each user 105 upon logging in will be provided with the topics and associated workspaces and windows from a prior interaction by that user with the system. In certain embodiments, the computer system 10.1 may not support login, or more than one account, in which case usage of the computer system 10.1 may be assumed to be by a single user, or by multiple users that are effectively treated by the computer system 10.1 as a single user.

Each window is managed by and is under control of a particular application. As shown in FIG. 1A, application A1 manages window W3, application A2 manages window W2, application A3 manages windows W1, W4 and W6. Application A4 manages windows W5 and W7.

As generally indicated in FIG. 1A, the configuration and usage of the workspaces and applications within a workspace are managed by the user 105. In a topic 100 in which the user 105 has designated more than one workspace, such as TpH (100.1) and TpC (100.3) user 105 may switch between the multiple workspaces, as indicated by arrows 108.1 and 108.3. For example, while TpH is selected or designated as the current topic, the user 105 may switch between WS1 (to use windows W1 and W2, managed by applications A3 and A2, respectively), and WS4 (to use window W3, managed by application A1). Similarly, the user 105, while TpC is selected as the current topic, may switch between WS3 (to use window W6, managed by application A3) and WS5 (to use window W7, managed by application A4). For simplicity of illustration, FIG. 1A shows a single workspace 104 or two workspaces 104 generated for each topic, but the computer system 10.1 may be configured to permit more than two workspaces 104 per topic 100.

If two or more output media are simultaneously available to the user 105, the system can allow the user 105 to choose to simultaneously display on different output media two or more workspaces 104 from the same or from different topics 100, or to allow the user 105 to choose to display any workspace 104 on two or more output media, or a combination of the above configurations.

Each topic has associated with it a trove storage 103. A trove storage 103, which may be seen at TrH.1, TrA.1 and TrC.1, contains a plurality of troves 102 and/or 109. To simplify illustration, additional troves are shown by the shaded oval-shaped elements (denoted as 102 and 109 in the legend at the lower left of FIG. 1A) in the trove storage 103 in FIG. 1A. An example of a trove 102 is a trove that contains trove data for window metadata 109. Trove windows W1, W4 and W6 retrieve data from and store data to troves TrH.1, TrA.1 and TrC.1 respectively, as indicated by bidirectional solid arrows. The windows W2, W3, W5, and W7 are ordinary windows, which can be document windows or can serve some other purpose. Document windows retrieve data from and store data to a document file, such as used for word processing documents, spreadsheets and presentations, where the documents are typically stored within a conventional file system hierarchy. All windows employ, for their window metadata, data stored in trove storage 103 as indicated by bidirectional dotted arrows extending into trove storage 103.1, 103.2 and 103.3 and pointing to trove data for window metadata 109.

A topic 100 can exist anywhere in a topic tree 106. As seen at 106, the Home topic includes topic A (TpA) 100.2 and topic B (not shown at right) as subtopics. Topic B has no subtopics, and topic A has two subtopics, C and D. Here, the term parent topic refers to a topic 100's parent in the tree, which can be the Home topic or a nonhome topic. The Home topic (TpH) 100.1 is the parent topic of topics A (TpA) 100.2 and B (not shown at right). Topic A is the parent topic of topics C (TpC) 100.3 and topic D (not shown at right).

There can be a group of workspaces 104 associated with any topic 100, not just the Home topic, as shown by the containment of workspace WS2 (104.3) within the box for TpA, and workspaces WS4 (104.4) and WS5 (104.5) within the box for TpC. Arrows 107.1 and 107.2, represent that topics A and C display the same relationship to each other and to the home topic as the relationships seen in the topic tree 106, which also represents the relationship of topic folders corresponding to those topics in the folder hierarchy maintained by the computer system 10.1. In certain embodiments, all workspaces 104 in a topic may share the same set of desktop icons 204 (shown in FIG. 2). Workspaces 104 in different topics would not necessarily have the same desktop icons 204.

Preferably, each topic 100 is represented by a data structure that is persistently stored and that has associated with it a topic folder. Each topic folder has associated therewith containers for document data and trove data (such as TrH.1, TrA.1, TrC.1 in FIG. 1A) and one or more workspaces 104.

In certain embodiments, the data associated with a topic folder may include data that has been explicitly designated by the user to be associated with the topic folder, or data that is automatically assigned to the topic by virtue of the topic being the current topic. The trove storage 103 associated with a topic folder will comprise storage that is managed by an app or the computer system 10.1 that is used in some way while the topic associated with topic folder is the current topic. In certain embodiments, trove data associated with a topic may include data that has been explicitly designated by an app in use by the user to be associated with the current topic, or that is implicitly designated by system software employed by computer system 10.1 to be associated with the current topic. By way of example, document data includes documents such as word processing documents, spreadsheet documents, and presentation documents, which a user typically uses from within a certain current topic 100 but can use from within any other topic. By contrast, trove data, which is associated exclusively with a certain topic, includes meta-data associated with any applications used within the current topic, such as preference data, and also files or objects that are managed by applications and presented to the user while the topic is the current topic, such as for example, photographs that are managed by a photo display/editing application, and email messages that are managed by an email application. An example of trove data stored by the system software is window position trove data stored by the system window manager.

Documents may be stored in a conventional file hierarchy. A user 105 can open any document stored in any folder, regardless of which topic is current at the time for the user 105. If the user 105 opens a document, the metadata for the window in which the document is displayed is stored into a trove associated with the current topic, because window metadata is trove data, which is topic-specific.

In certain embodiments, a feature referred to herein as topic inclusion is employed so that for example, when a user uses a picture management application, for example in the Home topic, the user will see all of the photos from the Photo Libraries of all descendant topics of the Home topic, merged in with the photos from the Home topic Photos Library. When the current topic is a subtopic of the Home topic and the user opens the Photos app, the current topic is at a deeper level of the topic tree, so the user will see all the photos from the subtopic Photos library but will not see any photos from the Home topic Photos library or Photos libraries of any of the Home topic's other subtopics. As usual, thanks to topic inclusion, the user will see all photos from all topics that are nested under the current topic, which in this case is a subtopic of the Home topic.

Through topic inclusion, a trove window such as W1 in FIG. 1A shows data belonging to the current topic and to all of its subtopics, recursively. In the example shown in FIG. 1A:

TrH.1 is a trove in Home topic (TpH 100.1), containing photos, for example.

TrA.1 is a trove in topic A (TpA 100.2), which is topic-included by TrH.1.

TrC.1 is a trove in topic C (TpC 100.3), which is topic-included by TrA.1.

There may be multiple subtopics within a topic. For example, a topic TrD.2 (not shown) may also be a trove in topic D, which is topic-included by TrA.1.

Reviewing the relationship among the elements shown in FIG. 1A:

WS1 and WS4 are workspaces 104 of Home topic (TpH 100.1).

WS2 is a workspace 104 of topic A (TpA 100.2).

WS3 and WS5 are workspaces 104 of topic C (TpC 100.3).

W1, a trove window in WS1, is associated with TrH.1 and is open in application A3.

W2 in WS1 is associated with WS1 and is open in application A2.

W3 in WS4 is associated with a document and is open in application A1, in full-workspace mode.

W4, a trove window in WS2, is associated with TrA.1 and is open in application A3.

W5 in WS2 is associated with a document and is open in application A4.

W6, a trove window in WS3, is associated with TrC.1 and is open in application A3.

W7 in WS5 is associated with a document and is open in application A4.

TrH.1, TrA.1, and TrC.1 are all in use by application A3, which is an app that allows user 105 to view and manipulate the kind of trove data stored in these troves.

In certain embodiments, if the user moves W1 to WS3 in topic C, W1 will automatically be associated with topic C instead of topic H and the contents of the trove window W1 will automatically change to show to the user 105 the contents of TrC.1, the trove containing the type of trove data that W1 displays.

In certain embodiments, the system allows the user to designate that a window should be associated with a topic other than the current topic, and the application will display trove data from the application's trove in the other topic.

Shaded oval-shaped elements representing window metadata 109 illustrate that every window has a trove for its associated metadata, including data for window position and size.

The relationship among the terms employed in FIG. 1A and elsewhere herein may be seen in FIG. 1B. In FIG. 1B the term "own" refers to an exclusive relationship where the owned entity has that relationship only with the owning entity. In other words, if A owns B, then B has no other owner with respect to the relationship. As shown in FIG. 1B, a user account has a relationship with a home folder where the user account "owns" the home folder. So, no other user account owns that home folder. The user account also "owns" the home topic. So, no other user account owns that home topic. The home folder has an "is a" relationship with a topic folder which means that the home folder functions as a topic folder. A topic folder "owns" a desktop folder. A topic may "own" one or more workspace(s). A topic also "owns" trove storage, which in turn "owns" one or more trove(s). Trove data is "stored in" a trove. A workspace "owns one or more" trove window(s). A workspace also "renders drawing commands to" an output medium. A trove window "sends drawing commands to" a workspace. An app "owns" a trove window, and "owns" trove data, which is "displayed in" a trove window. As further seen in FIG. 1B, a current topic is "one of" a home topic or a nonhome topic. A home topic or nonhome topic can be "the parent of" a nonhome topic and "owns zero or more" nonhome topics as subtopics. A nonhome topic "has as parent" and "is a subtopic of" a nonhome topic or a home topic.

FIGS. 2, 3, 4, 6, 7A, 7B, 7C, 7D, and 7E are screenshots illustrating, within the context of the macOS® operating system user interface, usage of an embodiment of a system implementing topics 100. FIG. 2 shows a desktop 202 with some desktop icons 204. The user has the finder application as provided by the macOS® as the active application, as seen at 206, with the "Documents" folder 208 opened in a Finder window 210, which is also more specifically the Documents folder window 208. In the Documents folder window 208, there can be seen a folder 212 for a company called CoDesign. In that folder 212, there are multiple folders for the company's clients (Smith 216, Thomas 218) and a BlueSky folder 214 for a special project. Placing cursor 215 with, for example, a mouse or trackpad, over the BlueSky folder and invoking a Finder contextual menu 302 for the BlueSky folder 214 (such as by right-clicking on the BlueSky folder 214) causes display of the image shown in FIG. 3 where the result is that a Finder contextual menu 302 pops up, and it has a menu item for Open As Topic 304, to permit user 105 to create a new topic from, and that is associated with, an existing folder. Movement of the cursor 215 to and Clicking on the Open As Topic 304 results in the image shown in FIG. 4. The result is that the entire macOS® screen 110 is now dedicated to the new BlueSky topic and an alias file referencing the BlueSky topic folder 214 is shown in the upper right at 402. In some embodiments, a name or icon for the current topic could be displayed on a menu bar, on a window title bar or status bar, in a front most graphics layer, or as part of a desktop background.

Because this was the first time the Open As Topic was clicked on the BlueSky folder 214, the computer system 10.1 responded by performing the actions shown in the flow diagram of FIG. 5 to create a topic and associate it with an existing folder as the topic's topic folder. The flow diagram of FIG. 5 is for illustrative purposes and the steps shown do not need to be performed in the sequence shown. As will be appreciated by those skilled in the art in view of the present disclosure, the ordering of the steps in FIG. 5 may be changed and certain steps may be performed concurrently. At 501, the system 10.1 allocates trove storage 103.1 and associates it with topic 100.1. At 502, the system 10.1 designates a folder as the topic folder associated with topic 100.1. At 503, a first workspace 104.1 is created, the workspace 104.1 is associated with the topic 100.1, and the workspace 104.1 is designated as the current workspace of topic 100.1. Typically, the new workspace 104.1 will take over the output medium. Preferably the computer system 10.1 changes a visual aspect of the BlueSky folder 214 when it becomes a topic folder associated with a topic 100.4 to indicate to the user 105 that the folder is a topic folder. A Desktop folder is created at 504 and associated with the topic 100.1. An alias file referencing the topic folder is created at 505 and placed in the Desktop folder. The topic 100.1 is then designated at 506 as the current topic.

Figure 6:
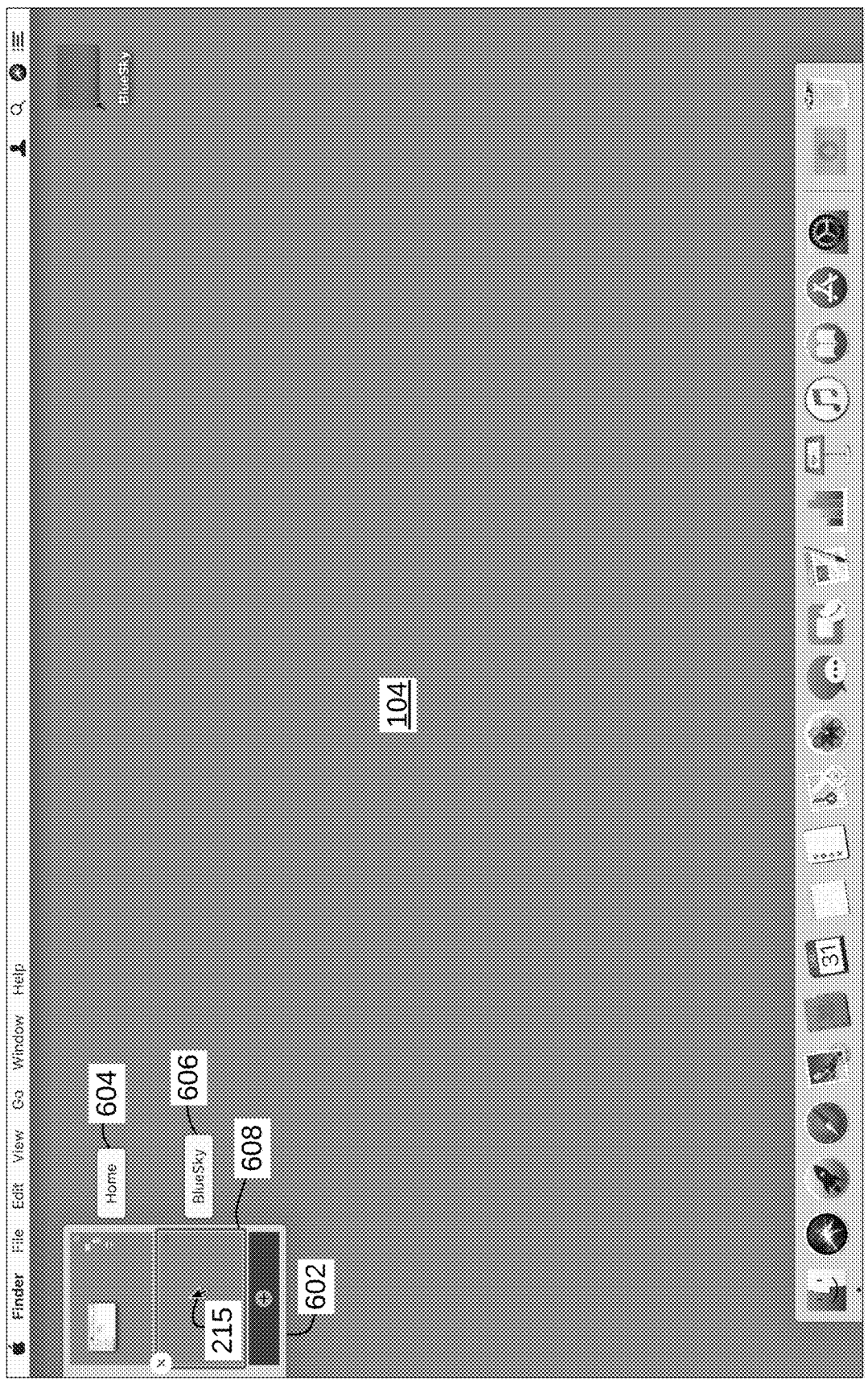

Optionally, in certain embodiments, moving the cursor 215 briefly to the upper left corner of the screen exposes the topics panel 602, resulting in the image shown in FIG. 6. As seen, the result is that the topics panel 602 appears at the upper left of the screen. The topics panel 602 shows thumbnails of open topics, labeled with their names, Home 604 and the BlueSky 606. Preferably the current topic is highlighted in some manner, such as by providing a border as seen at 608 to provide a visual indication to the user. In certain embodiments, topic names appear while the user has moved the cursor over the topics panel 602. Clicking on a topic thumbnail switches to that topic. While the user has moved the cursor over a topic thumbnail, a close button appears, which the user can use to close the topic and remove it from the topics panel 602 until the user reopens the topic later. In certain embodiments a topics panel may cover a large portion, possibly the entire output medium, as for example the "home screen" on a touch screen computer running Apple's iOS® operating system, and topic icons or thumbnails can be arranged ad hoc or in tree structures or other arrangements. In other arrangements, a panel may contain topic icons intermingled with app icons, perhaps as a default home screen, such as on a mobile device.

For every Home folder, a conventional embodiment of macOS® provides a set of standard Folders: Desktop, Library, Pictures, Downloads, Documents, and so on. The Library folder, which is hidden by default in a conventional embodiment of macOS®, in embodiments disclosed herein contains trove storage for trove data such as preferences and other user state, such as the size and position of windows, bookmarks, etc. Another example, in disclosed embodiments of trove data is that of the Mail application available from Apple, which stores emails as trove data under the Library folder. Another example is the Apple Notes app, which stores notes as under the Library folder. Preferably, for every one of the many topics a user 105 can have, the computer system 10.1 creates a topic folder with its own separate set of standard folders, which are used by applications while the user has selected a topic as the current topic.

Figure 7A:
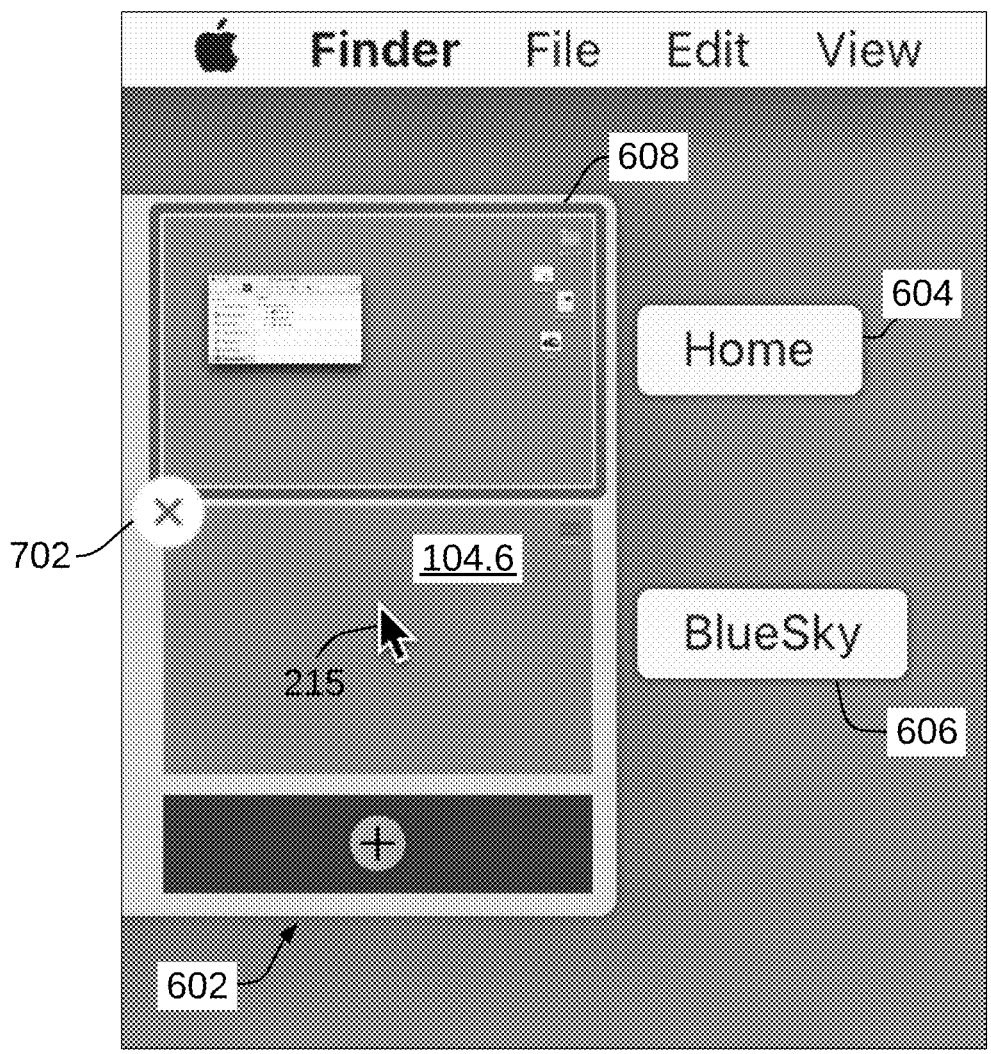
FIGS. 7A, 7B, 7C, 7D and 7E are additional screenshots illustrating usage of an embodiment of a system implementing topics.
Figure 7B:
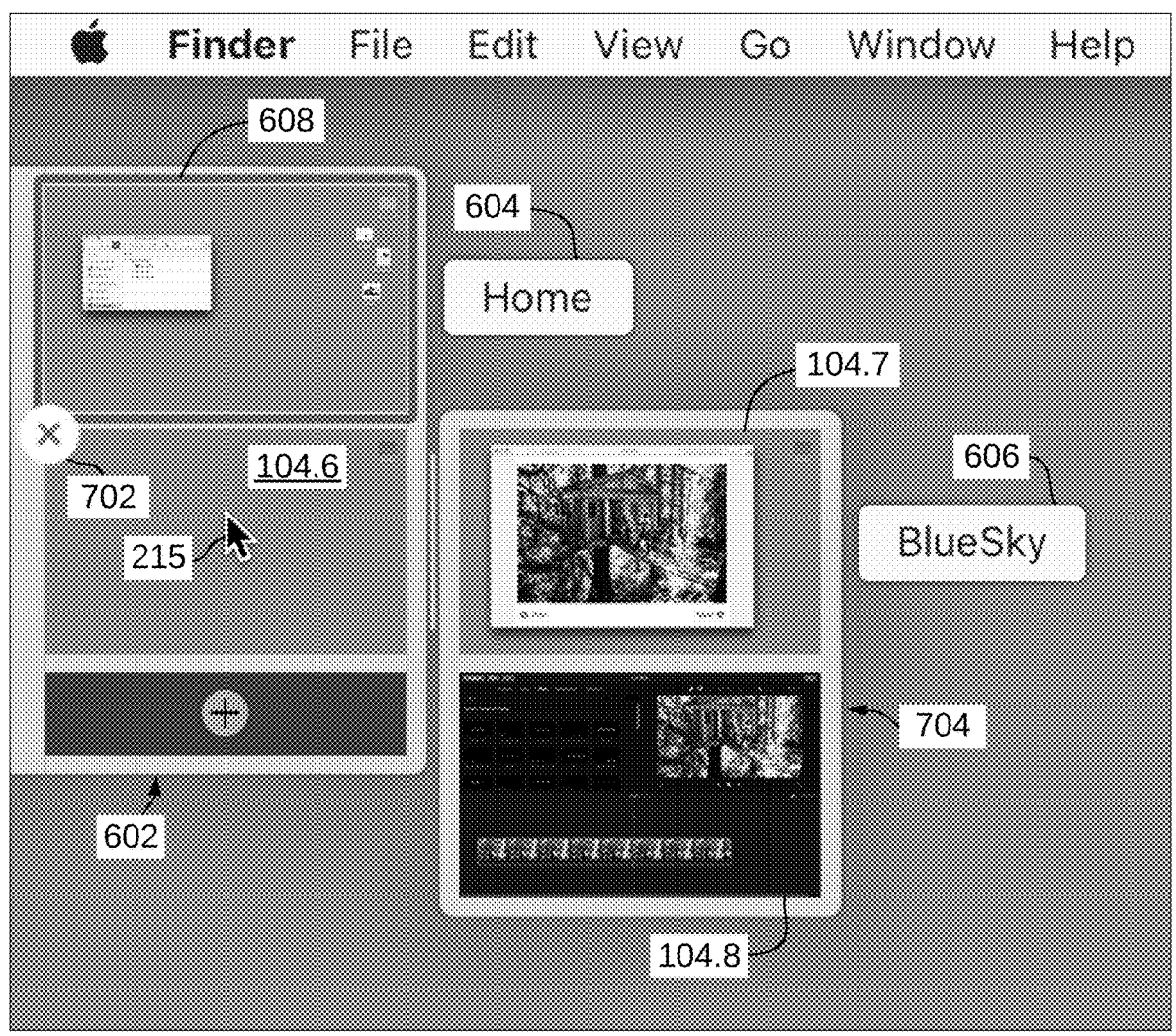

FIGS. 7A and 7B show further details of workspaces 104 as associated with a topic 100. The user can manually create a new workspace 104. In certain embodiments, whenever the user puts a window into full-workspace mode the computer system 10.1 will create a new workspace 104 in the current topic 100 for the window. When the window leaves full-workspace mode that workspace 104 in certain embodiments will cease to exist. In FIG. 7A, the BlueSky topic 606 has only one workspace 104.6. In FIG. 7B, the BlueSky topic 606 has three workspaces 104: the current workspace 104.6 for the topic is at left, displayed as a thumbnail in the topics panel 602 itself, and thumbnails for the two additional, currently-hidden workspaces 104.7 and 104.8 are to the right, displayed in a workspaces subpanel 704. These additional workspaces 104 are displayed while the user 105 moved the cursor over the thumbnail for the topic that owns them. The workspace 104.8 shows iMovie® in full-workspace mode. As seen by the border 608, in FIGS. 7A and 7B, the home topic is selected as the current topic.

Continuing with the example, in FIG. 7B, with a single click the user 105 switches to another workspace 104 and to another topic 100.

Figure 7C:
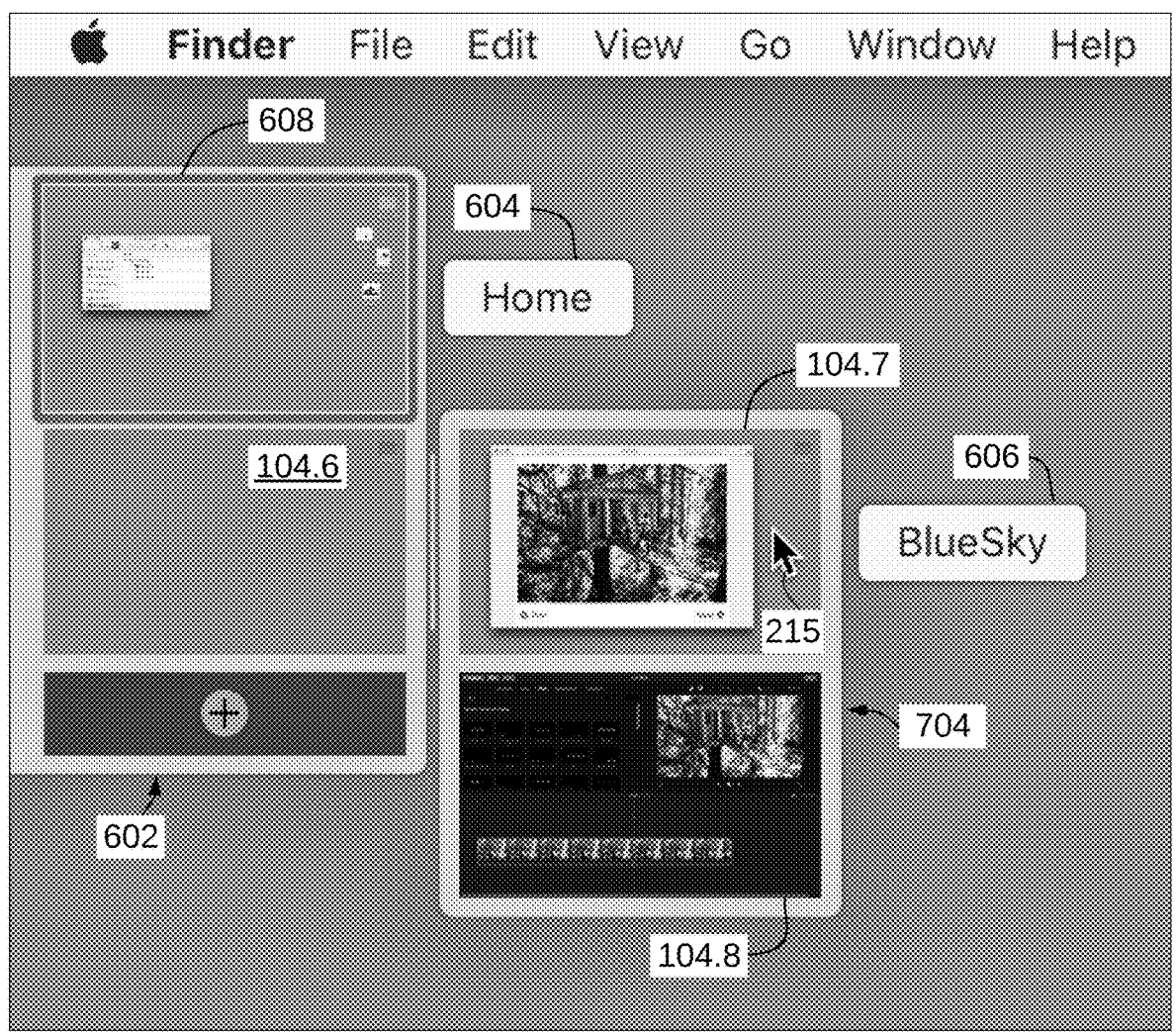

The user 105 moves the cursor 215 over workspace 104.7, resulting in the image shown in FIG. 7C.

The result is that the user is no longer hovering over the BlueSky topic thumbnail, so the close button 702 in FIG. 7B on the BlueSky topic disappears.

Turning to FIG. 7C, the user 105 clicks the workspace 104.7 thumbnail to select the workspace 104.7.

Figure 7D:
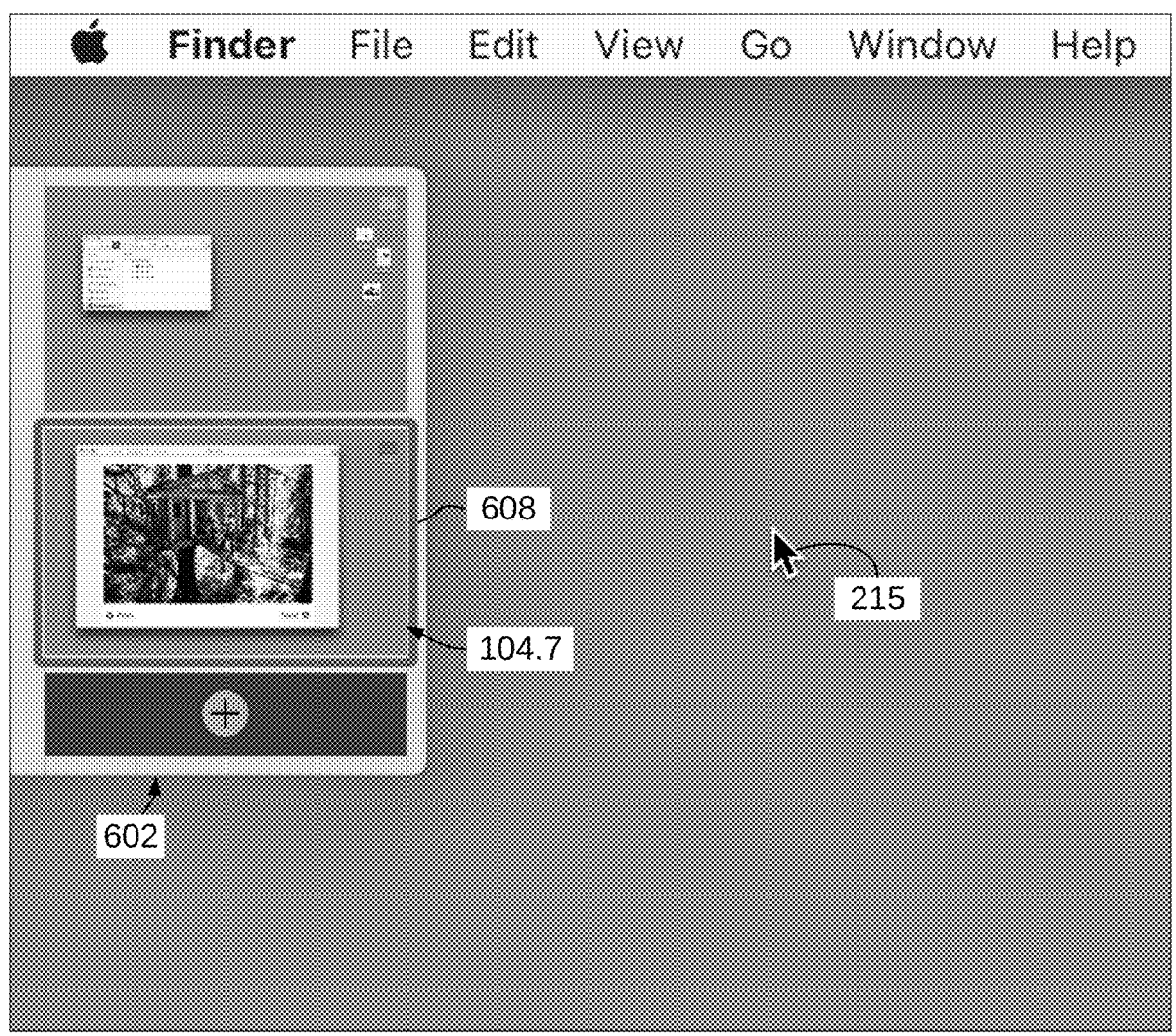

The result, seen in FIG. 7D, is that the lower thumbnail in the topics panel 602 shows that the workspace 104.7 is now the current workspace 104 within the BlueSky topic, and the border 608 around the BlueSky topic thumbnail shows that the user 105 has switched to the BlueSky topic.

The workspace 104.7's workspaces subpanel 704 and the topic names disappear because the cursor 215 is no longer over the topics panel 602.

Figure 7E:
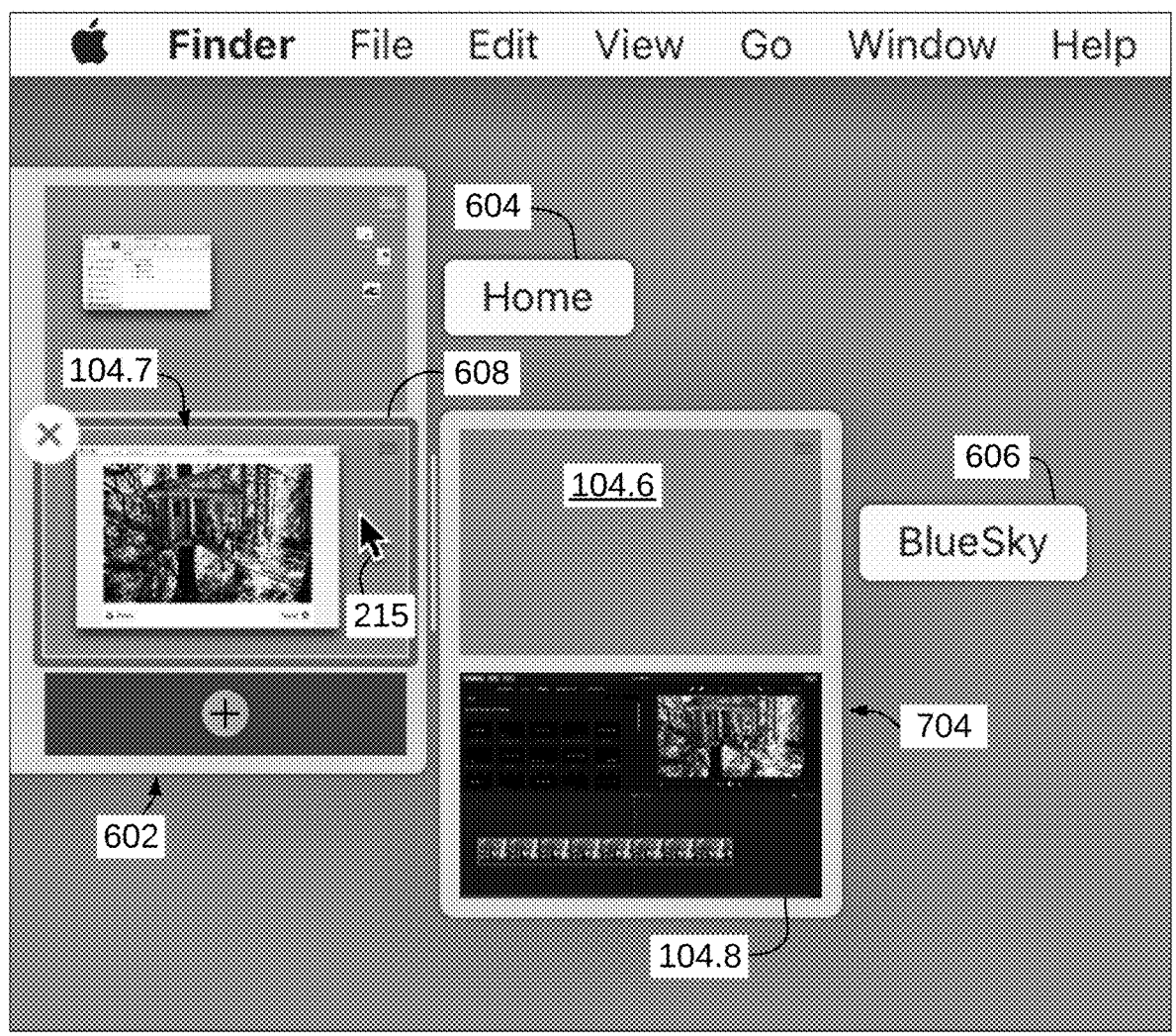

In FIG. 7D, movement of the cursor 215 by the user 105 over the BlueSky topic thumbnail results in the image shown in FIG. 7E.

The result is that the workspace 104.7's workspaces subpanel 704 at right appears again, and the user 105 can see now that the upper workspace 104 in the workspace 104.7's workspaces subpanel 704 has been exchanged with the current workspace 104.8 of the BlueSky topic. Also, the close button and the topic names are revealed again for the lower thumbnail because the cursor 215 is hovering over the lower topic thumbnail.

FIGS. 8A, 8B, 8C, 8D, and 8E illustrate that in certain embodiments, application preferences 803 in force for the current topic 100.2 are either stored in a trove of the current topic 100.2 or are inherited by the current topic 100.2 from an ancestor topic or from default preference storage 811, and that modifications of preference values 804 in preference storage 808 occur in copy-on-write fashion. Preference panel 802 permits the user 105 to view and customize individual application preferences 803. This preference inheritance system allows the user to specify particular preference values 804 that should be in force for the current topic, while sharing, by default, preference values 804 from ancestor topics. This per-topic preference value feature has profound uses, beyond simple convenience preferences such as font size. For example, the user 105 can set an identity to be used for outgoing communication, such as their email "From" address, or their outgoing phone number; or the user 105 can set an account to be used in accessing shared or external services, such as a database or an external online account. In some embodiments, an external event, such as an incoming phone call, can cause the system to offer to the user 105 the opportunity to switch from a current topic to a topic selected from a set of topics relevant to the external event. The relevance of an external event to a topic might be determined by the applicability of data received in conjunction with the event to certain trove data, for example, topic-specific preferences. The system responds to an external event to generate for display to the user, one or more topics, to permit the user to select a new topic as the current topic. The generation of the one or more topics may be determined as a function of trove data and data pertaining to the external event. An example of this would be matching the called phone number of an incoming call to an outgoing phone number preference value for a topic or topics in a topic subtree.

Solid square boxes in preference panel 802 and in the diagram for preference storage 808 illustrate preference values 804. A solid square box in preference storage 808 illustrates where a preference value 804 is stored; a dashed square box in preference storage 808 illustrates where a preference value 804 could be stored but is not stored.

The square boxes are shown with two possible values: with an X for "ON", or without an X for "OFF". For example, in FIG. 8A, the system is displaying preference 803.1 "Enable Color", whose preference value 804.1 is "ON".

Inheritance of preference values within preference storage 808 is illustrated by vertical dashed arrows between individual possible storage locations for preference values 804, each of which is stored in default preference storage 811 and may be stored in one or more troves 102. For example, in FIG. 8A, topic trove 102.3 of topic 100.3 inherits preferences by default from the trove 102.2 of its parent topic 100.2, which inherits preferences by default from the trove 102.1 of its parent topic, the Home topic 100.1, which inherits preferences by default from default preference storage 811.

In certain embodiments,

An application used by a user in a current topic 100.2 (which corresponds to preference panel 802.2) will attempt to access storage for a particular preference value 804 in the application's trove 102.2 for the topic 100.2.

For a particular preference 803.1, storage for the preference is found in the trove 102.2 for topic 100.2, so the application uses that storage for the preference value 804.1.

For a particular preference 803.2, storage for the preference is not found in the trove 102.2, so the preference value is inherited, and therefore the application looks to the trove 102.1 for the parent topic 100.1, where it does find storage for the preference and uses that storage. Preference inheritance spans multiple levels of parent topics, if present.

For a particular preference 803.3, storage for the preference is not found in the trove 102.2 for topic 100.2, so the preference value is inherited, and therefore the application looks to the trove 102.1 for the parent topic 100.1; upon finding no storage there and noting that there is no parent topic for Home topic 100.1, the application uses the default preference storage 811 for the preference value 804.3.

There are no preference values 804 in preference storage 808 in the trove 102.3 for the "C" topic 100.3, so storage for all preferences used by the topic 100.3 when it is the current topic will be found variously in a parent topic trove 102.2 or in an ancestor topic trove 102.1 or in default preference storage 811.

The preference value 804.1, which was changed for topic 100.2 and the preference value 804.2, which was changed for topic 100.1 and the default value for preference value 804.3 are all inherited by default for topic 100.3 and its descendants.

In FIGS. 8A, 8B, 8C, 8D, and 8E preference panel 802 permits the user 105 to view and customize individual application preferences 803, by clicking on controls to change individual preference values 804. In the example preference panel 802, the preference values shown are ON/OFF values, but they can be numbers, text, or other value types. For example, in FIG. 8A, the system is displaying preference 803.1 "Enable Color" as a preference whose preference value 804.1 is "ON".

In FIGS. 8B, 8C, 8D, and 8E, the system, in response to user input, is indicating, by highlighting 807, that preferences 803 are individually changeable and that their preference values 804 are subject to inheritance either from an ancestor topic trove 102 or from default preference storage 811.

Figure 8A:
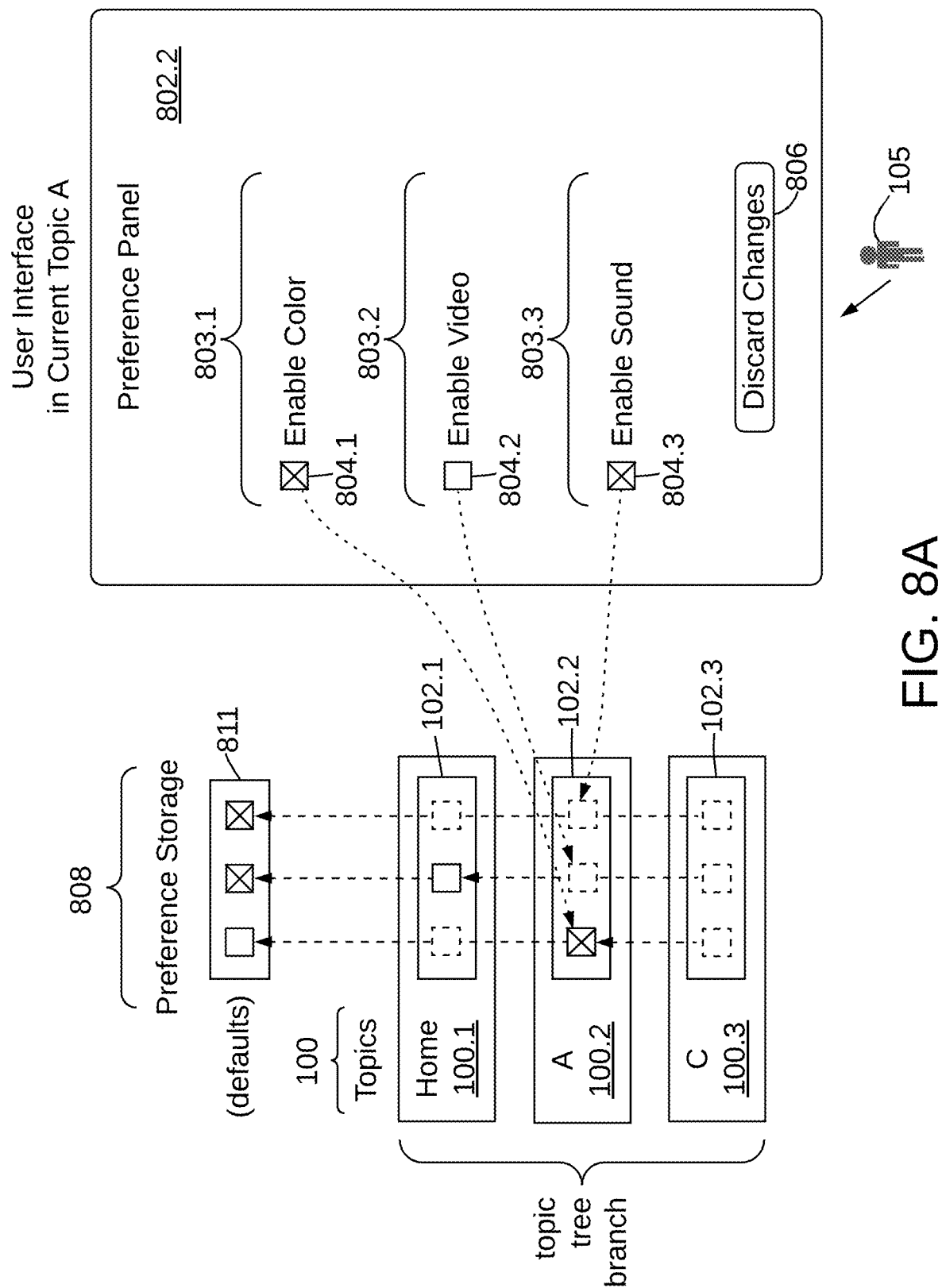
FIGS. 8A, 8B, 8C, 8D, and 8E illustrate preference inheritance.
Figure 8B:
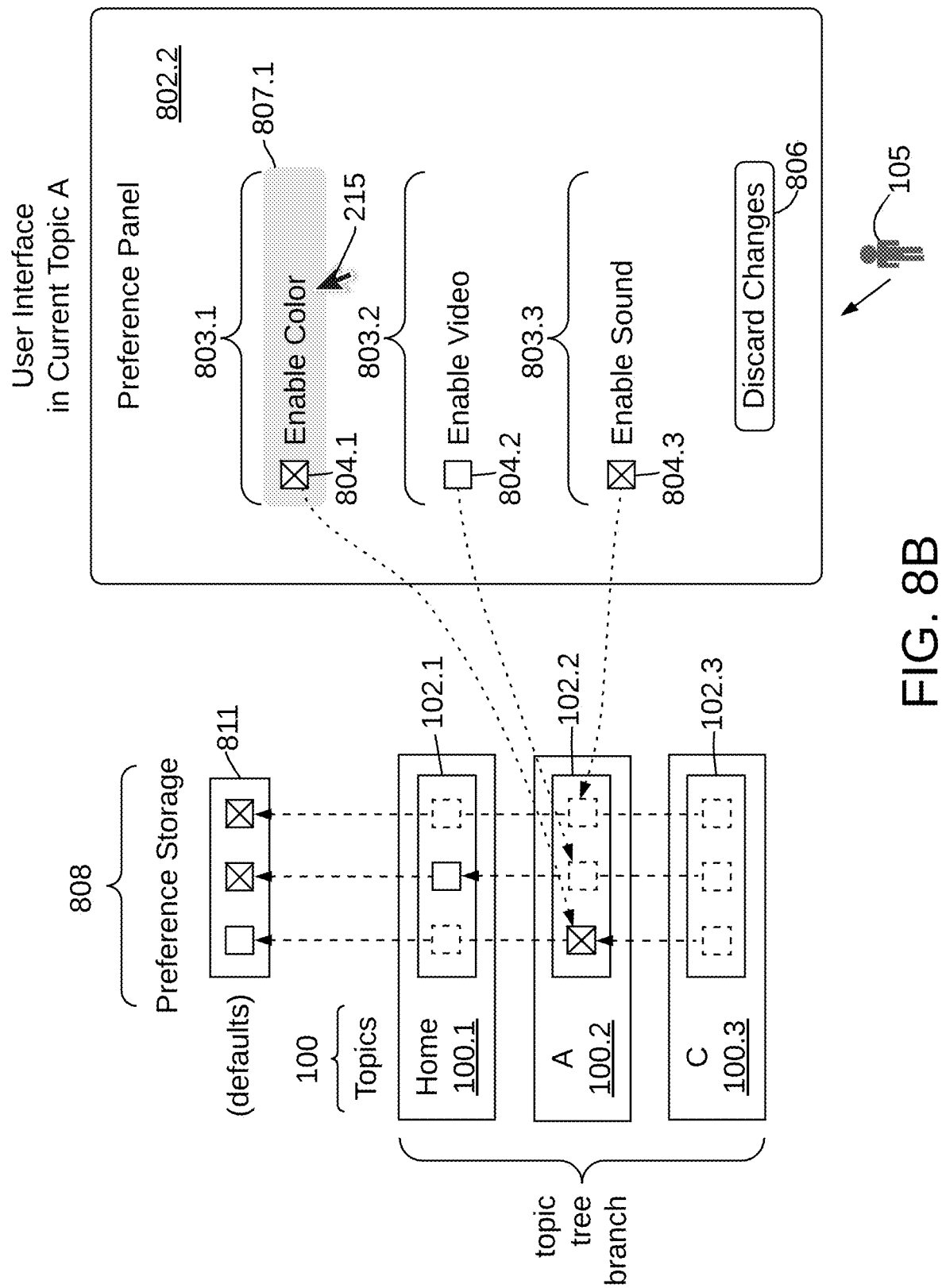
Figure 8C:
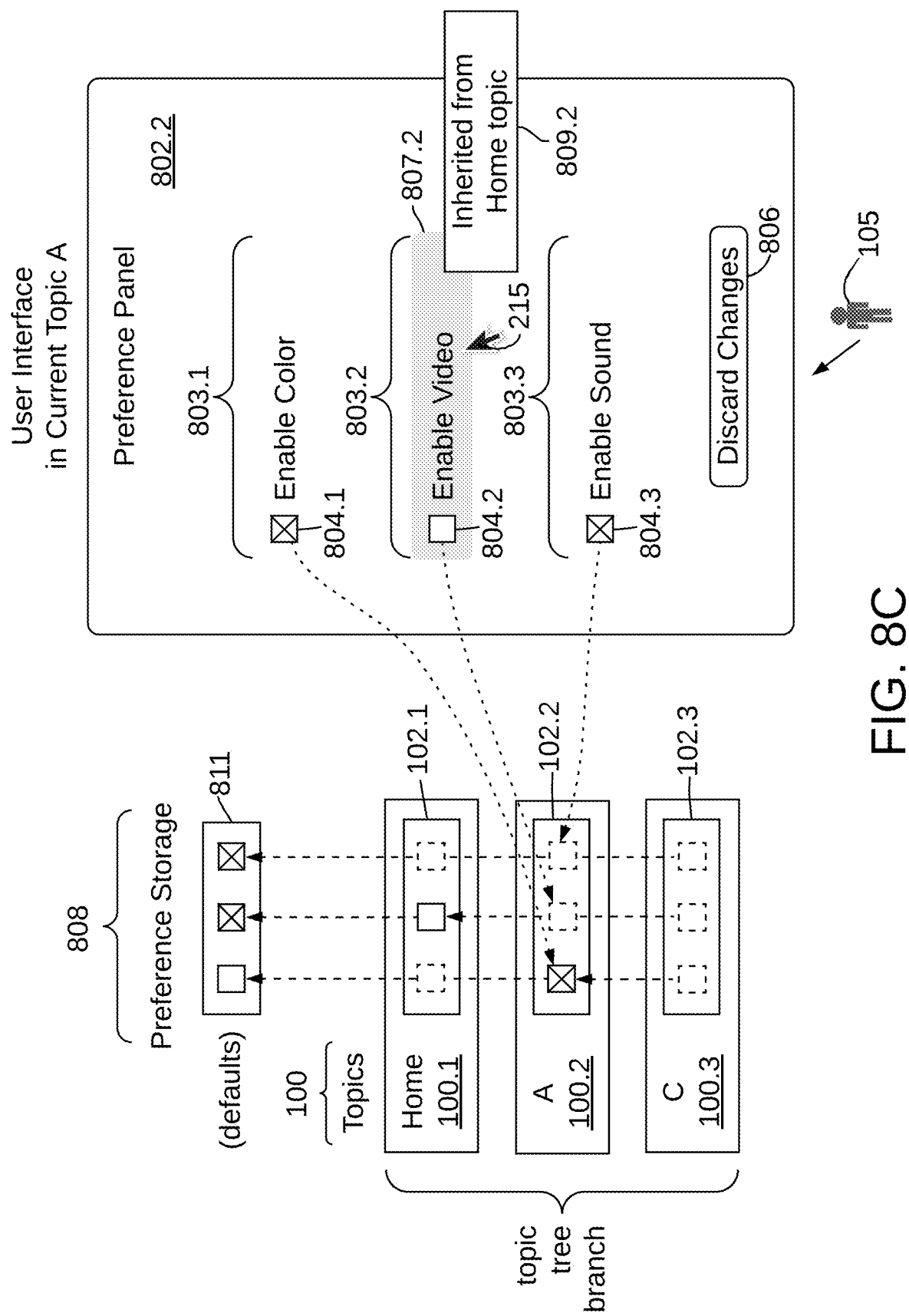
Figure 8D:
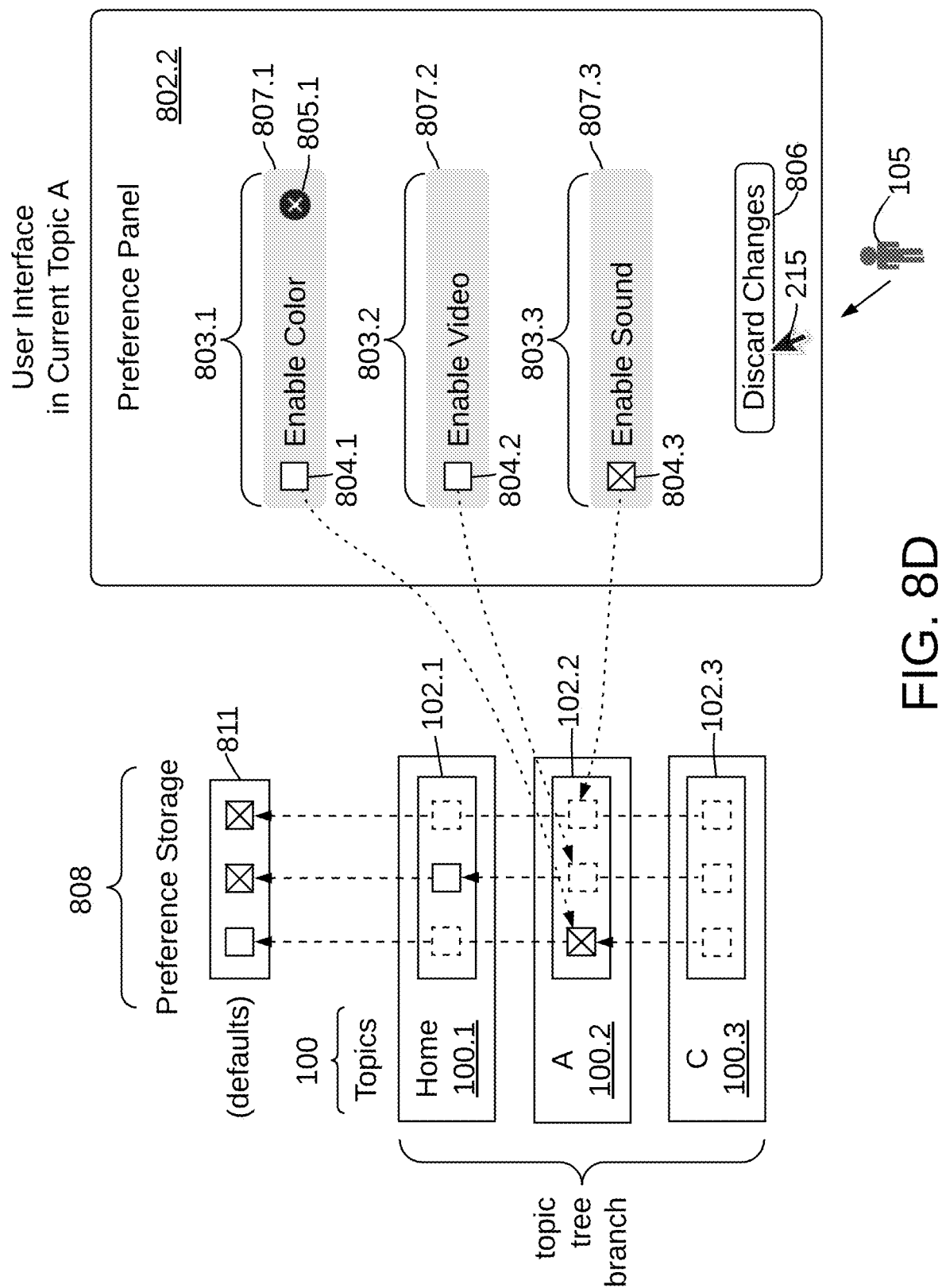
Figure 8E:
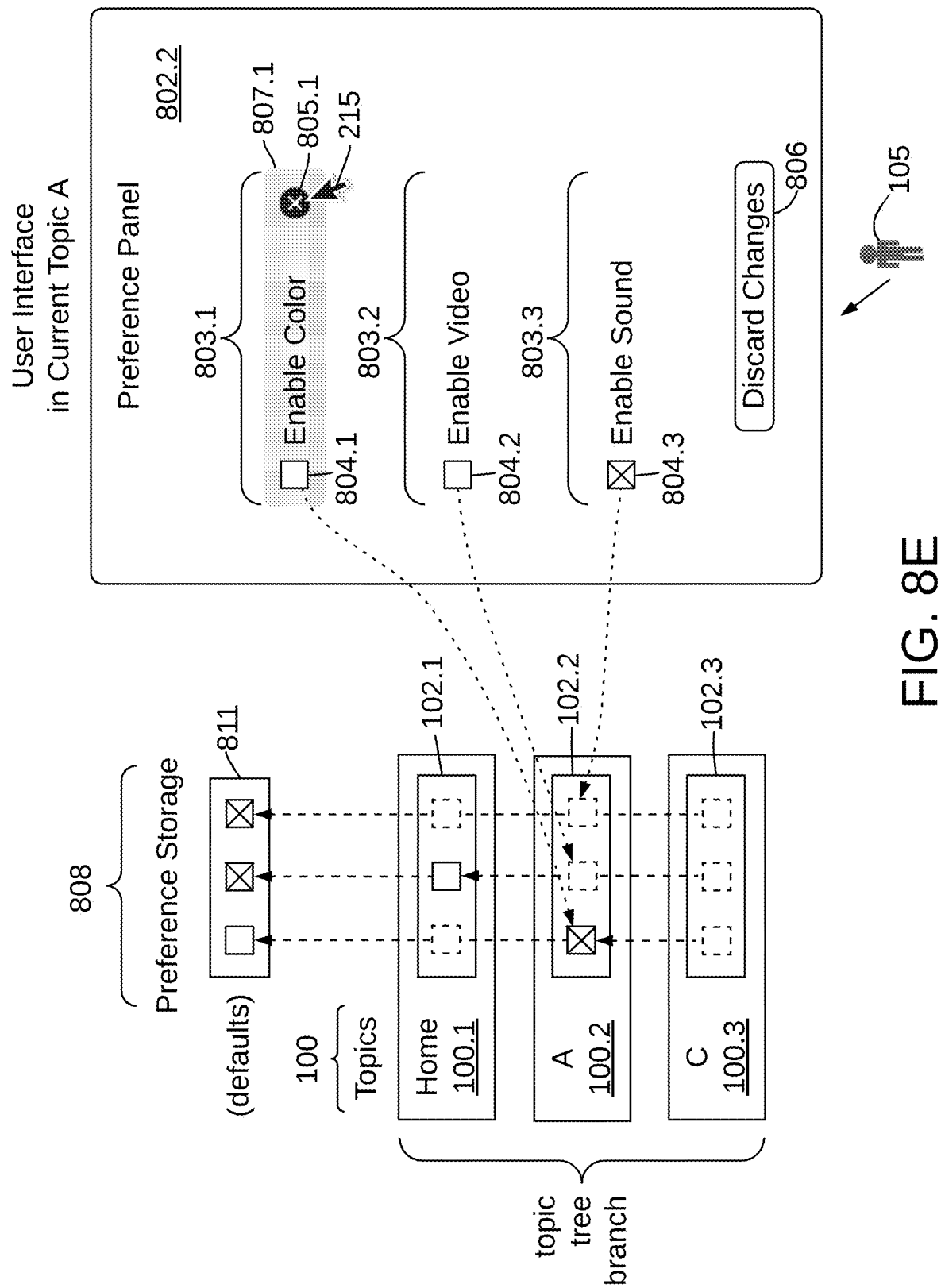

In FIGS. 8D and 8E, the system, in response to user input, is showing a discard button 805.1, which indicates that preference 803.1 has been changed.

In FIGS. 8D and 8E, the system, in response to user input, is showing a preview of the inherited preference value 804.1, to which the changed preference 803.1 will revert if the user discards the change to the preference value 804.1.

In FIGS. 8B and 8E, in some embodiments, a mouse over gesture on the preference 803.1 elicits the highlighting 807.1.

In FIG. 8C, in some embodiments, a mouse over gesture on the preference 803.2 elicits the highlighting 807.2 and the information display 809.2, which indicates the inherited source of the preference value 804.2.

In FIG. 8D, in some embodiments, a user input mouse over gesture on the Discard Changes button 806 elicits (a) the highlighting 807, (b) the display of a discard button 805.1, and (c) a preview of the inherited preference value 804.1, to which the changed preference 803.1 will revert if the user discards the change to the preference value 804.1.

In FIG. 8D, if the user clicks the Discard Changes button 806 then the system reverts all changed preferences in preference panel 802 to their respective inherited preference value 804.

In FIG. 8E, in some embodiments, a user input mouse over gesture in the rightmost portion of the highlighting 807.1 of preference 803.1 elicits (a) the highlighting 807.1, (b) the display of a discard button 805.1, and (c) the preference value 804.1, to which the changed preference 803.1 will revert if the user discards the change to the preference 803.1. The relevance of the cursor position for the display of the discard button 805.1 can be most clearly seen by comparing FIG. 8B with FIG. 8E.

In FIG. 8E, if the user clicks the discard button 807.1, then preference 803.1 reverts to the preference value inherited from the parent topic or if none, the default preference storage 811.

It should be noted that the foregoing features relating to responding to user input, displaying preference values 804, displaying inherited preference values, discarding changed preferences, preference highlighting 807, information display 809, and displaying and responding to activation of discard buttons 805 and 806, work similarly even if the Home topic is the only topic.

FIGS. 9A, 9B, 9C and 9D illustrate topic inclusion, a feature of the system that allows an application to display its trove data that is associated with a first topic, intermingled with trove data associated with descendant topics of the first topic, where the first topic is typically the current topic. In certain embodiments, a default topic inclusion may be employed such as seen in FIG. 9A. Turning back to FIG. 1A, as seen at topic tree 106, the Home topic has two subtopics, A and B. Topic A has two subtopics, C and D, which are descendent topics of the Home topic. Topics A, C, and D are all descendant topics of the Home topic. Topic B has no subtopics. With the default topic inclusion shown in FIG. 9A, an application displays, in addition to trove data associated with the first topic, trove data associated with the first topic's descendant topics; the application does not display trove data associated with topics that have any other relationship to the first topic, such as ancestor topics or sibling topics. In FIGS. 9A, 9B, 9C and 9D, topics are denoted as Home or in upper case letters (A, B, C, D), and trove data associated with these topics are denoted in corresponding lower-case letters (h, a, b, c, d).

As seen at the table in FIG. 9A, when the current topic is the Home topic, the application displays trove data associated with the Home topic intermingled with trove data associated with the Home topic's descendant topics A, B, C, D (trove data: ha b c d). When the current topic is topic A, the application displays trove data associated with topic A intermingled with trove data associated with topic A's descendant topics C and D (trove data: a c d). The application does not display trove data associated with topic B while the user's current topic is topic A because topic B is not a descendant of topic A. Topics B, C and D have no subtopics and therefore while one of them is the current topic, the application displays only trove data associated with that topic (trove data: b or c or d).

Figure 15A:
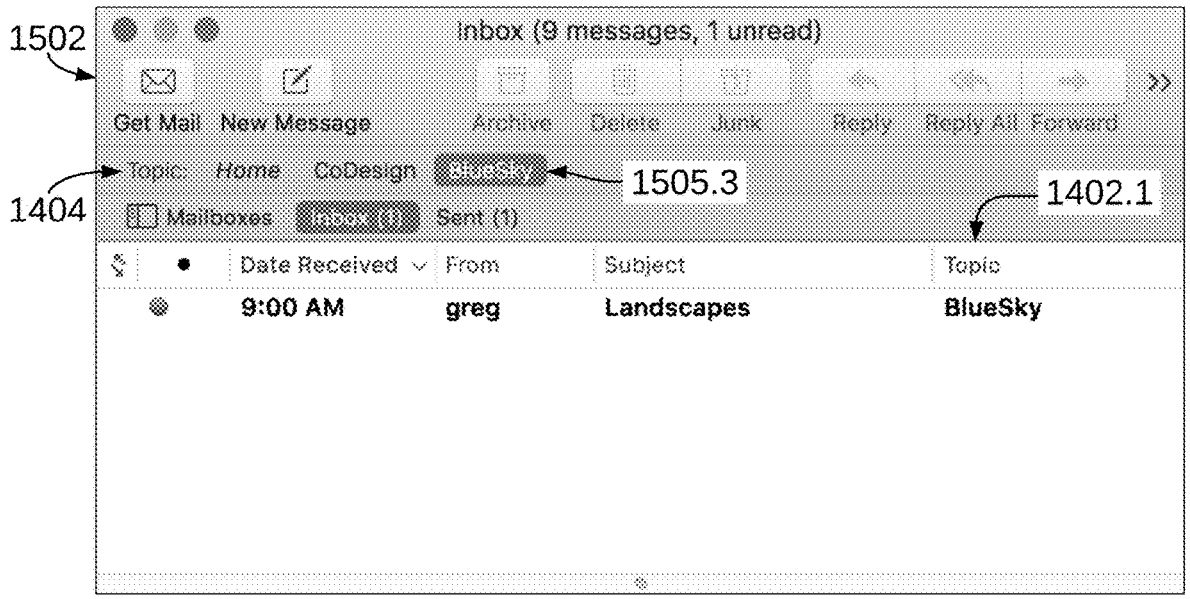
FIGS. 15A, 15B and 15C provide a user-interface-level overview of topic inclusion scope control in connection with email.
Figure 15B:
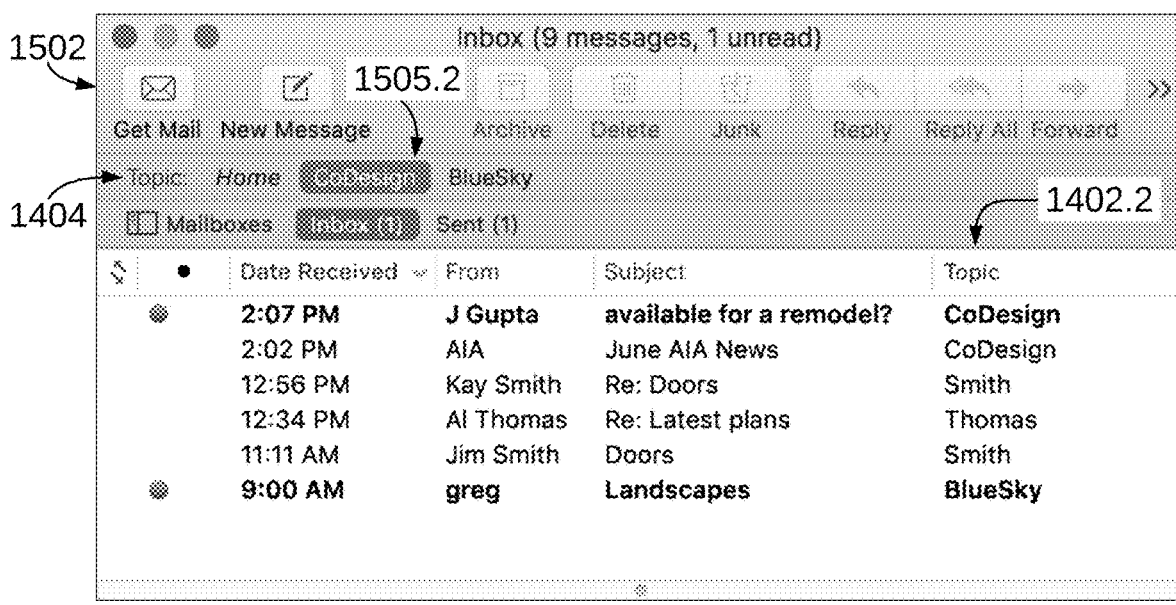
Figure 15C:
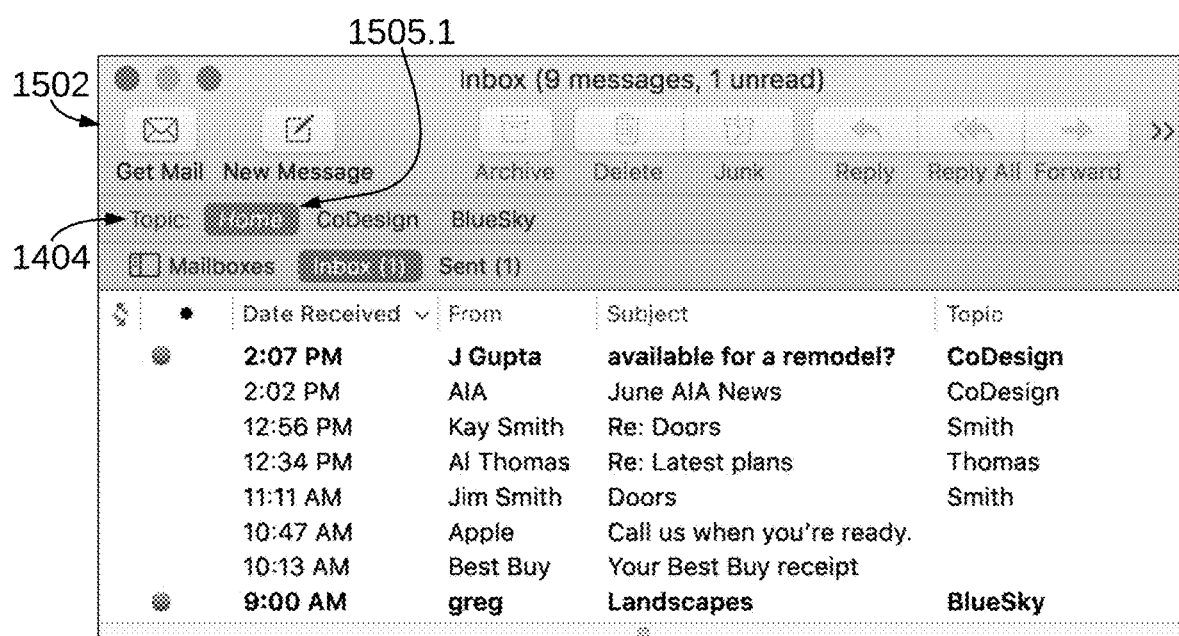

FIGS. 9B and 9C illustrate another embodiment of topic inclusion, in the form of topic inclusion scope control, which permits the user to cause the application to depart from the default topic inclusion view, such as seen in FIG. 9A, to display a view of trove data from topics other than from the current topic and its descendant topics. Such other views typically allow the user to see a view as if the user's current topic were some other selected topic that is an ancestor topic of the current topic. Two modes are shown, an inclusive mode and an exclusive mode. In some embodiments the system provides a Topic bar 1404 and allows the user to select topics via scope buttons 1505, as seen in FIGS. 15A, 15B, and 15C.

The table in FIG. 9B illustrates a topic inclusion scope control feature that allows the user to select a topic other than the current topic for the purpose of seeing the trove data that the application would display if the selected topic were the current topic C. FIG. 9B shows an embodiment in which the user may select the current topic C or an ancestor of topic C. In inclusive mode, the application displays trove data associated with the selected topic and its descendant topics. Each row of the table shows all possible permutations of user selection as underlined text, like Home or A or C. For example, rows 1, 2, and 3 of FIG. 9B show inclusive mode:

At row 1, the user has selected the Home topic. The application displays trove data associated with the Home topic and its descendant topics, A, B, C, D (trove data: h a b c d).

At row 2, the user has selected topic A. The application displays trove data associated with topic A and its descendant topics, C and D (trove data: a c d).

At row 3 the user has chosen topic C. The application displays only the trove data associated with topic C, which has no descendant topics (trove data: c).

Rows 4-11 in FIG. 9B show exclusive mode, in which the application displays only the trove data for the selected topic(s) and does not display trove data for topics that are not selected.

FIG. 9C shows another example of topic inclusion scope control. The trove data in the table in FIG. 9C illustrates the trove data associated with topic(s) that the user can see when the current topic is topic A. Because the Home topic is the only ancestor of topic A, in inclusive mode (rows 1 and 2), the user 105 is presented with two choices for Topic bar selections: Home or A. In exclusive mode (rows 3-10), the user 105 is also presented with a third option, which permits selection of trove data in subtopics to the current topic and their descendants (of which there are none here), in this case, topics C and D.

At rows 1 and 2, the trove data the user sees is the same as in rows 1 and 2 of FIG. 9B.

At row 3, the Home, A and subtopics are selected, permitting the user to see trove data associated with topics Home, A, C, D (trove data: h a c d).

At row 4, the Home and A topics are selected, without selection of subtopics of A, permitting the user to see only trove data associated with topics Home and A (trove data: h a).

At row 5, Home and subtopics of A are selected but topic A is not selected, permitting the user to see trove data associated with topics Home, C and D but not topic A (trove data: h c d).

At row 6, only the Home topic is selected, permitting the user to see only trove data associated with the Home topic (trove data: h).

At row 7, the A topic and subtopics are selected but the Home topic is not selected, permitting the user to see trove data associated with topics A, C and D but not the Home topic (trove data: a c d).

At row 8, only topic A is selected, permitting the user to see only trove data associated with topic A (trove data: a).

At row 9 only subtopics are selected, permitting the user to see only trove data associated with subtopics C and D (trove data: c d).

At row 10 no topics are selected and hence the user sees no trove data.

As seen, the computer system 10.1, via the inclusive and exclusive modes of selection and the "sub" selection of descendant topics, provides the user flexibility and ease of selection in the trove data that may be seen from the vantage point of a given current topic.

FIG. 9D illustrates the effect of a private topic on the topic inclusion feature. A user may designate a topic as a private topic so that the system will allow the user, for example, to avoid inadvertently disclosing the existence of a first topic A or its contents to a coworker who can see the user's screen but who is not cleared for topic A. An application may display, through topic inclusion, the existence of, or the trove data associated with, a private first topic A or its descendent topics only if the current topic is the first topic A or a descendant of topic A. In the example shown in FIG. 9D, topic A is designated by user 105 as private. In row 1, the current topic is the Home topic, which is neither topic A nor one of its descendants; therefore, the application does not display the existence of or trove data associated with topic A or any of its descendants. The system does display the existence of, and trove data associated with, private topic A when (a) private topic A is the current topic, or (b) any of topic A's descendant topics is the current topic as for example, if the current topic is topic C, and the user uses the topic inclusion scope control feature to widen the topic scope to topic A or to the Home topic.

Figure 10:
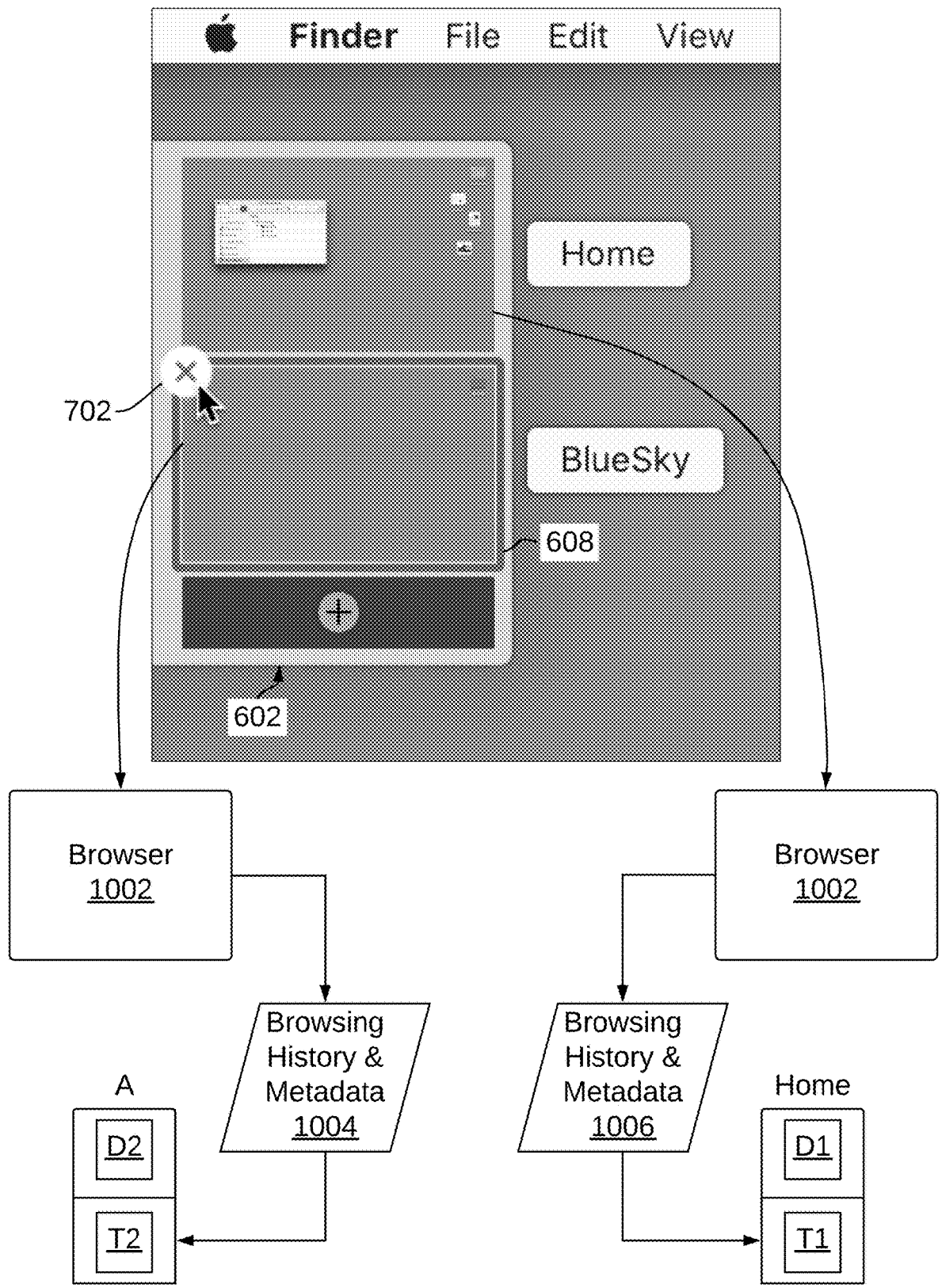
FIG. 10 illustrates topics in connection with a web browser.

FIG. 10 illustrates an embodiment of topics in connection with usage of a web browser. In FIG. 10, the user has selected the BlueSky topic, which by way of example, corresponds to topic A of FIG. 1A. The user opens a browser 1002. Because the user has not used the browser 1002 to perform browsing while the BlueSky topic is the current topic, there is no browsing history associated with the BlueSky topic. Browsing by the user while the BlueSky topic is the current topic generates browsing history and metadata 1004 associated with the BlueSky topic. The browsing history includes URLs visited by the user while using the browser 1002 when the BlueSky topic is selected as the current topic. The metadata includes other data associated with the browser 1002 while the BlueSky topic is selected as the current topic, such as the browser windows and tabs that are open, the window sizes and placement, font size selection, etc. The user may then close the BlueSky topic by bringing up the topics panel 602 and closing the BlueSky topic by clicking its close button 702 in the panel. This causes the Home topic to become the current topic, where some further browsing via the browser 1002 may be performed. This causes browsing history and metadata while the Home topic is the current topic to be stored to browsing history 1006 associated with the Home topic. The user may then reopen the BlueSky topic. To reopen the BlueSky topic, the user brings up the topics panel 602 again and clicks the + button. This brings up a menu of topics, and the user selects BlueSky. The current topic is now again the BlueSky topic with everything still exactly as before when the user left the BlueSky topic. The same browser windows are open, with the same tabs and the same forward-and-back history for each tab, and the browser history menu is exactly as the user left it, even though while the user was using the Home topic the user did some browsing there.

Many applications retain information (metadata) pertaining to prior or current documents opened by the application. This information can often be found in the selections available in menus such as "Open Recent" and "Window". Applications that are compatible with the computer system 10.1 provide only the information associated with the current topic. In some embodiments, information associated with a topic can be shown in callouts for the topics as in the Window menu example. The user selects the BlueSky topic and opens a word processing document and creates a document named "Ideas" on the Desktop, and then closes the document. Later, when the BlueSky topic is the current topic, the user seeks to reopen the Ideas document. This can be accomplished by using the Open Recent submenu selection. The word processor displays the document title as a recently opened document. Moreover, the Open Recent submenu isn't cluttered with other documents has been working on in other topics. There are no other items in the Open Recent menu because the current topic is the topic 100 created for BlueSky, and the state of the Open Recent menu is stored in a trove within the current topic, isolated from troves in other topics 100 and in the user's Home folder. The Window menu for the word processor also shows only the Ideas document, even though other word processor documents are open in the Home topic. The system presents to the user a workspace 104 that makes provides an experience to the user similar to that of working on a computer dedicated to the selected topic.

Figure 11:
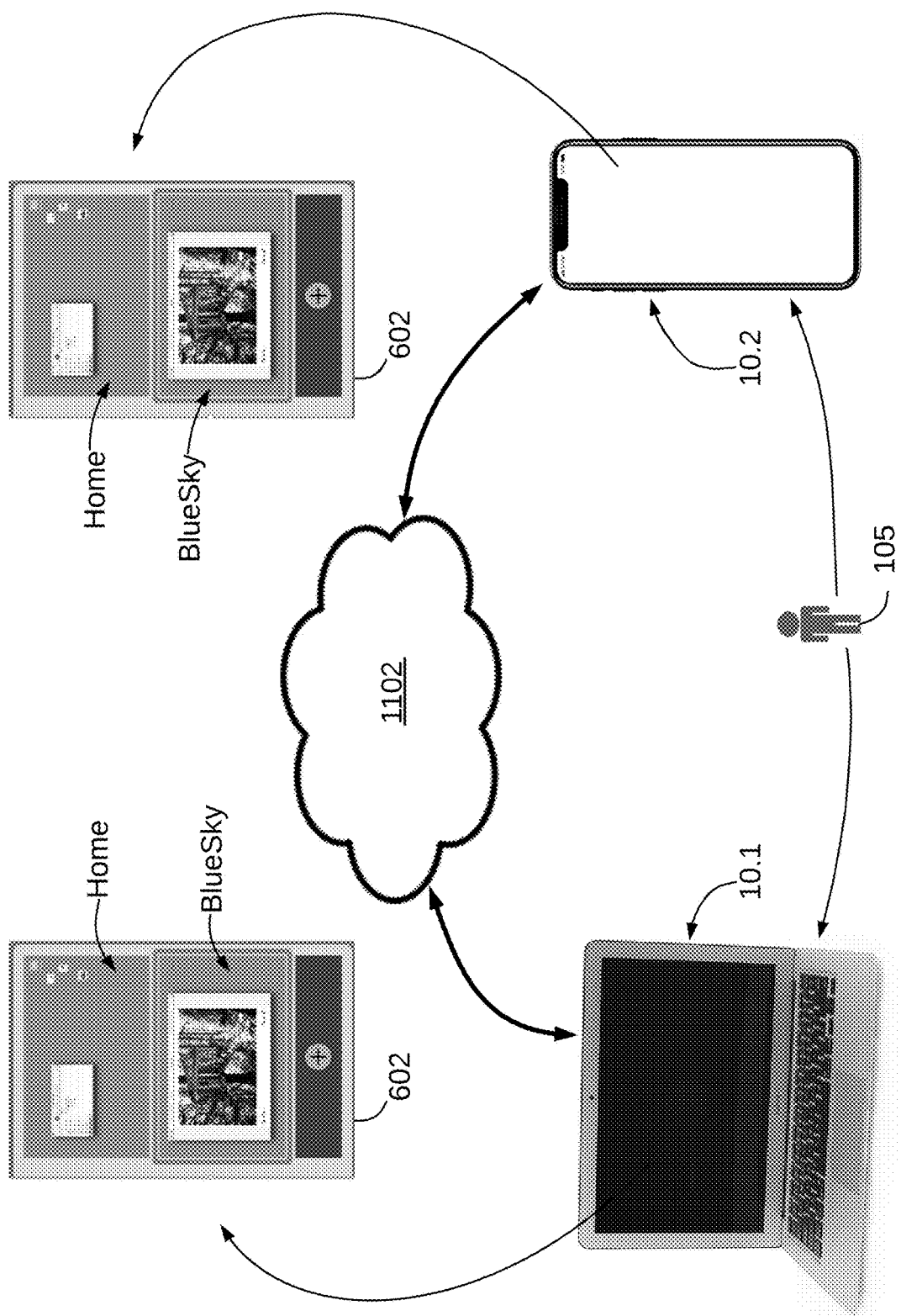
FIG. 11 illustrates an example of operation of topics across two separate computer systems.

FIG. 11 illustrates an example of operation of topics across two devices. In FIG. 11, computer system 10.1 is in communication with a mobile device 10.2. As seen in FIG. 11, the computer system 10.1 takes the form of a laptop computer executing instructions to implement the features and functions described herein. It should be understood that the laptop in FIG. 11 is merely illustrative and other computing devices, such as desktop computers and tablets may be used in implementing computer system 10.1. Computer system 10.2 takes the form of a mobile device for purposes of illustration of the usage of topics across multiple devices, by user 105 who may at different times use computer system 10.1 and computer system 10.2 to work on one or more topics. For example, the user may need to take some photos to incorporate into a document titled "Ideas." The user ensures that a file sharing capability is enabled on the systems 10.1 and 10.2. The file sharing capability may take the form of the iCloud Photo Library as provided by Apple Inc. The user 105 brings up a topics panel 602 on the mobile device 10.2 to see the user's list of topics. Two topics are shown, Home and BlueSky. User 105 selects BlueSky as the current topic and takes some photos with the mobile device. The user 105 then opens a photos app on the mobile device that the user uses to manage photographs. The app shows only the photos the user 105 has just taken because the BlueSky topic is new, and these are the first photos the user has taken while the BlueSky topic is the current topic. Later the user 105 uses the computer system 10.1 and selects BlueSky as the current topic. The user 105 opens a photos app on the computer system 10.1, and sees the photos taken earlier on the computer system 10.2 while the BlueSky topic was chosen as the current topic, because the BlueSky topic is the current topic on the computer system 10.1. The photos apps on the computer system 10.1 and the computer system 10.2 employ the file sharing facility selected by the user 105 to synchronize the photos among the devices and implement topics compatibility to keep the photos organized by topic.

Complete isolation of topics 100 is not beneficial in every instance as it can require unnecessary duplication of work by the user. For example, many user preferences are likely to be applicable to multiple topics. The user should not need to start from scratch setting their preferences for every new topic. But customization of certain preferences by topic is desirable. Preferably, existing user preferences in a first topic are inherited by a new second topic child of the first topic. The user can override a preference and even discard the override, so the preference reverts to the inherited preference. In addition, it is sometimes useful to use data in one topic that is associated with another topic. In the disclosed embodiments, for data that is stored in document files, the Finder and the Open File and Save File dialogs (as used in the macOS® environment, or similar functionality in other environments) preferably let the user access files anywhere, no matter what topic they are in. In the disclosed embodiments, for data that is stored in troves, the topic inclusion feature lets the user access trove data in a topic-focused manner, as is explained in further detail in connection with FIGS. 12A and 12B. An exception to such open access is explained in connection with FIG. 9D, where private topics are off limits except from inside the private topic itself or one of its subtopics. In the case of trove data, compatible apps implement the topic inclusion feature to permit display of data outside the current topic.

Complete isolation of topics 100 would restrict the ability of a user 105 to see trove data outside of the current topic 100. In certain embodiments a topic inclusion feature lets the user 105 see trove data outside the current topic. The user may set the private topic option on a topic 100 so that the topic inclusion will not show the topic or its data unless the current topic is the topic itself or in one of the topic's subtopics. In the following example, none of the topics 100 have their private topic option set. The user goes to the topics panel 602 and switches to the Home topic. The user opens a photos management app, and here sees all of the user's photos, including the ones added while the BlueSky topic is the current topic. If the user had any other topics 100, the user would also see the other topics' photos, mixed in, perhaps all sorted by date, as usual. There are various ways the user can control topic inclusion, which will be explained in more detail. The user can arrange to see: everything, only photos that are in specified topics 100, or only photos that are not in specified topics 100. Also, the user can arrange to see tags showing the topics that photos belong to. One benefit of topic inclusion is that it makes it easy to move items around between topics. In the Photos app, the user can select a BlueSky photo and reassign it from BlueSky to Home, or vice versa. Or the user can reassign a photo from one topic to another or copy it to another topic. Topic inclusion makes it a lot easier to manage the trove content of topics 100 than if topics were isolated islands. Preferably, topic inclusion applies to any trove data where it is appropriate, for example in notes and mail apps, in addition to photos.

Figure 12A:
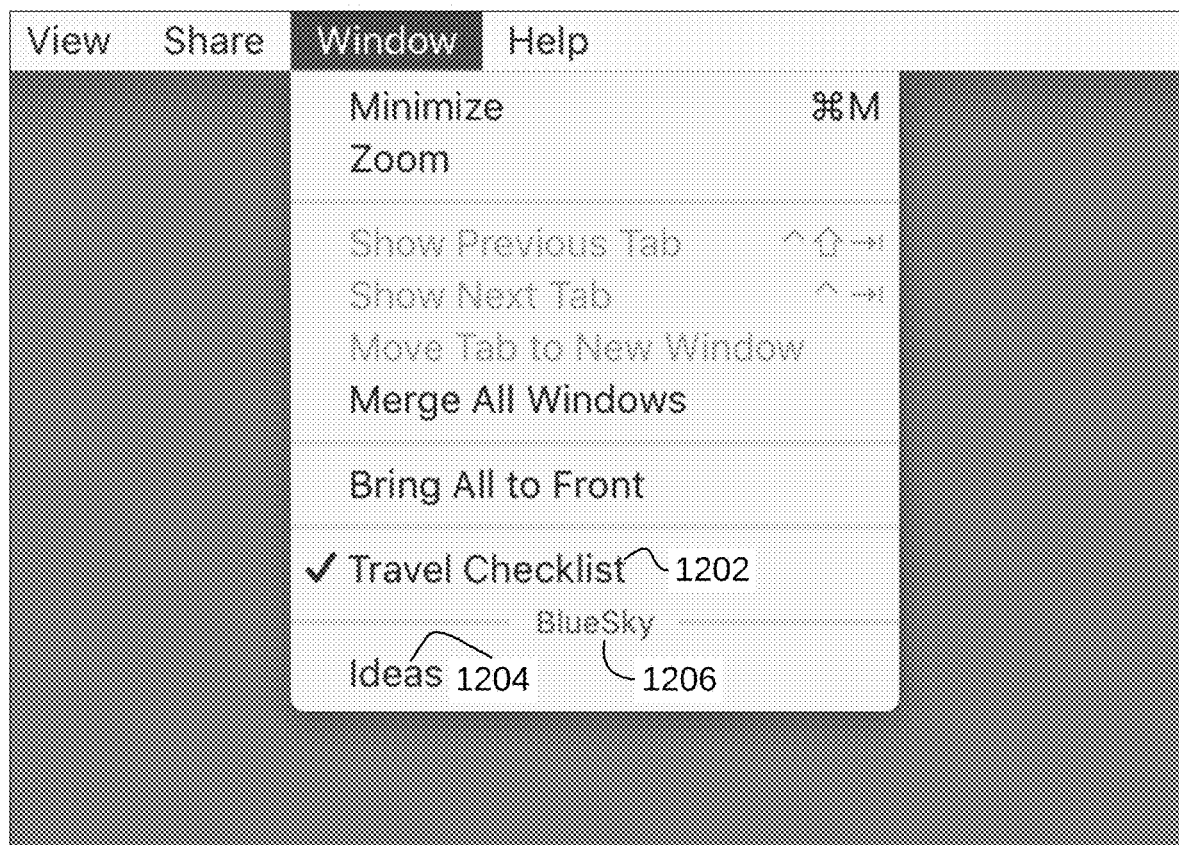
FIGS. 12A and 12B provide a user-interface-level overview of topic inclusion.
Figure 12B:
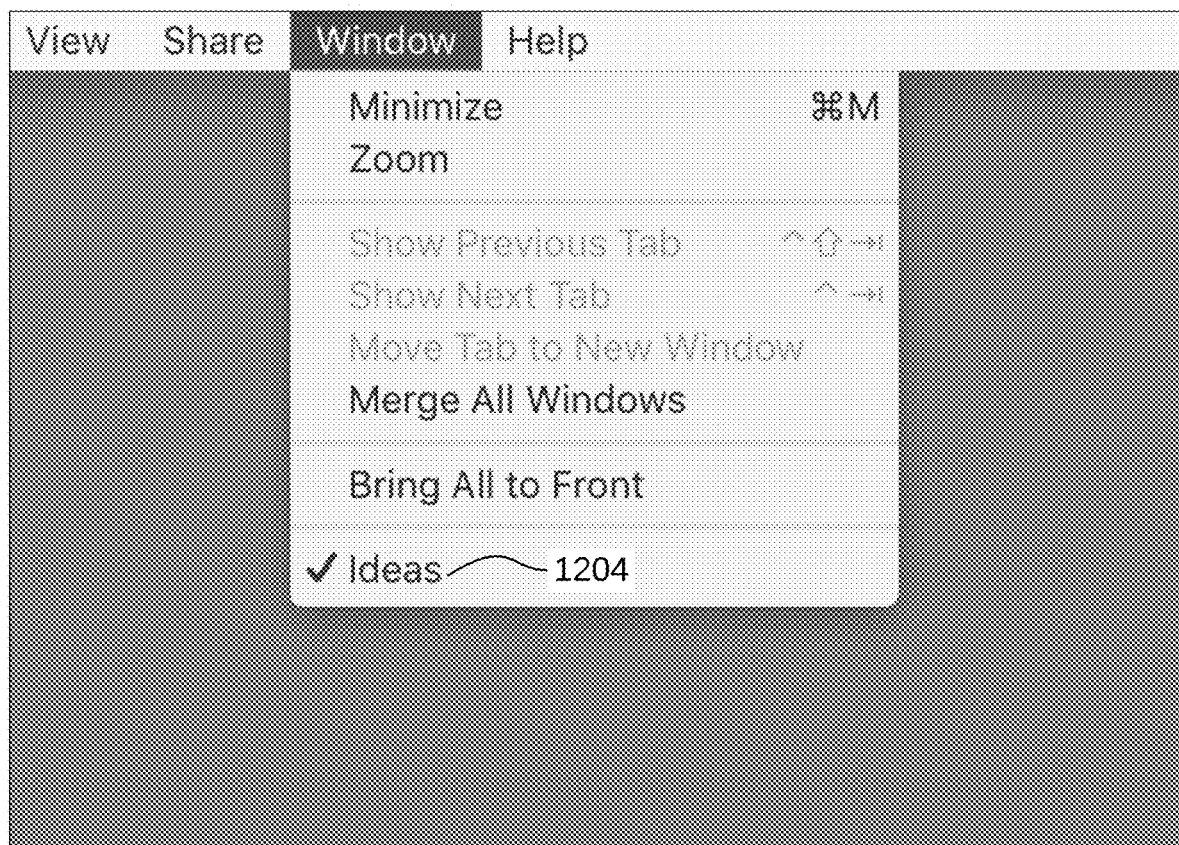

FIGS. 12A and 12B provide examples of topic inclusion at the platform user-interface-level. As with the photos example of topic inclusion, the topic inclusion feature preferably is available for items in an app's Window menu (in the macOS® system). FIG. 12A shows an example where the current topic is the Home topic and shows a Window menu for a word processing app. The Window menu shows that the Travel Checklist document, seen at 1202, is open in the Home topic (which is selected by the user as the current topic), and it shows that the Ideas document, seen at 1204, is open in the BlueSky topic, seen at 1206. The user clicks on Ideas 1204 in the Window menu. The result is shown in FIG. 12B where the user's click has caused the current topic to be automatically switched to the BlueSky topic, with the Window menu of the word processing app showing that only the Ideas document is open, with the BlueSky topic as the current topic. Subsequent actions the user may take in the same app or in other apps would be performed with the BlueSky topic selected as the current topic. This feature permits easy switching between topics. The user does not need to manually switch between topics with a separate input. Instead the computer system 10.1 automatically switches the current topic to the topic of a document window selected by user 105. In certain embodiments, other menu items that permit opening of files, such as the Open Recent menu, a menu item that shows recently used documents, work similarly. In some embodiments, when the user selects an item from another topic, the system 10 may permit the user 105 to choose whether to switch to the other topic before opening a window to display the item or instead to take some other action, such as remaining in the current topic while opening the item in a window designated as belonging to the other topic.

Figure 13:
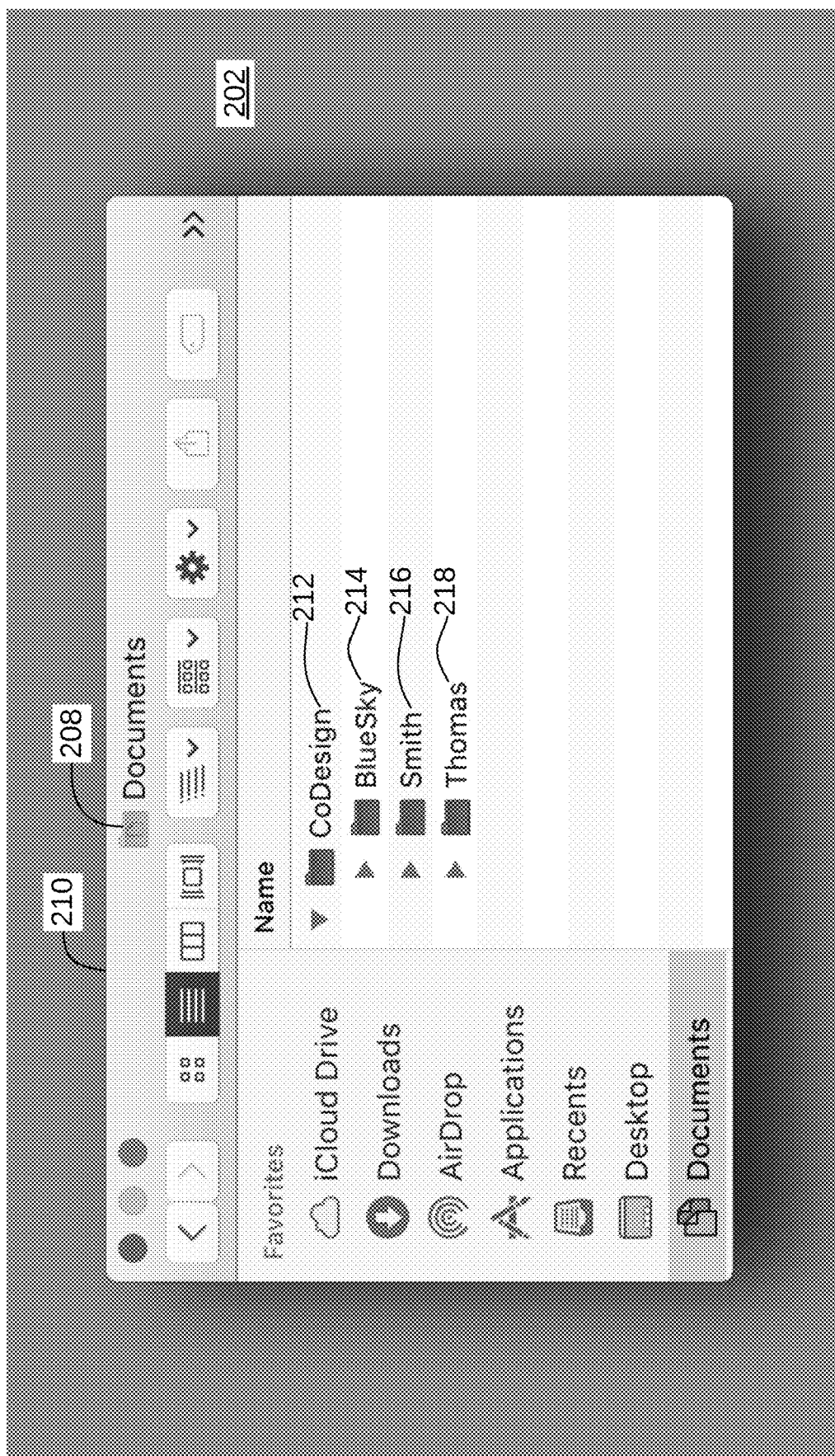
FIG. 13 provides a user-interface-level overview of nested topic folders.

FIG. 13 provides a user-interface-level overview of topic folders for nested topics. The topic inclusion feature takes advantage of a topic tree folder structure, anchored by the Home topic. In the embodiment shown in FIG. 13, the folders 212, 214, 216, and 218 each correspond to a topic and serve as the storage location for the associated topic. The BlueSky topic folder 214 is automatically nested inside the Home folder by virtue of being contained within the Home folder tree. In FIG. 13, the user makes the CoDesign 212, Smith 216, and Thomas 218 folders into topic folders. Preferably they turn a different color to reflect the change. As a result, the BlueSky, Smith, and Thomas topics are nested under the CoDesign topic, and the CoDesign topic is nested under the Home topic.

Figure 14A:
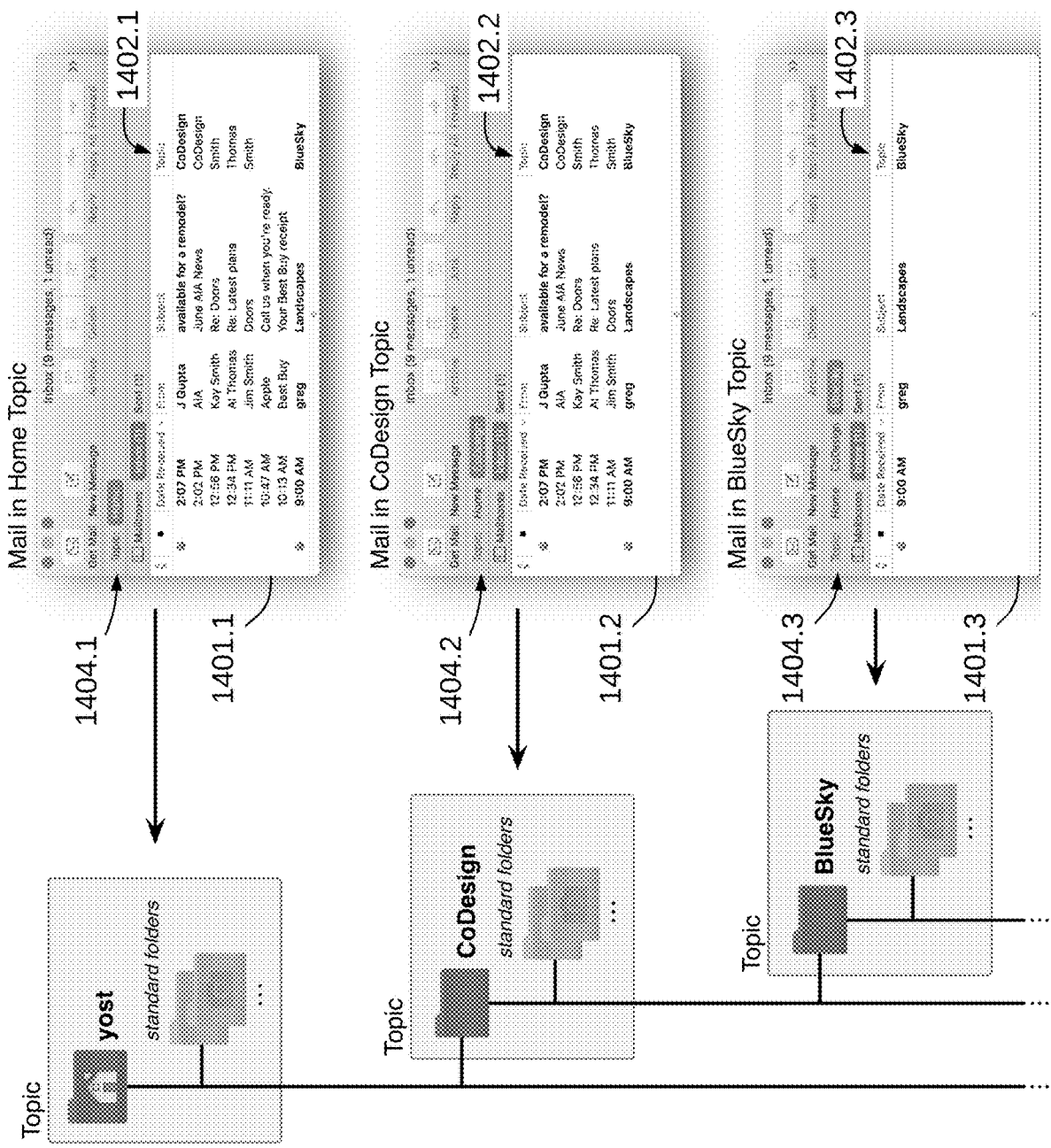
FIGS. 14A and 14B provide a user-interface-level overview of topic inclusion with email and the effect of private topic designation on topic inclusion.

FIG. 14A provides a user-interface-level overview of topic inclusion with email. Email is one of the biggest problem areas in the complexity of modern life. One way that topics help is that in certain embodiments, each topic has its own set of standard mailboxes: Inbox, Sent, Drafts, Trash, and so on. If the user 105 creates a mailbox, then subtopics have their own mailboxes of the same name. Preferably, assigning emails to topics should be as automatic as possible because there is a constant stream of new emails. Assignment of outgoing emails to topics is relatively straightforward. The mail app may automatically assign outgoing emails to the currently selected topic when the emails are created. The timing of incoming emails cannot be controller by the user 105 and assignment to topics is hence more challenging. Certain mail apps have rule systems that may be employed to assign incoming emails to topics in one of three ways: (i) assigned with certainty—for example, an email that's in a chain of replies to an email already assigned to a topic or an email from an address associated with only one topic; (ii) assigned as a suggestion—for example, a phrase was found in the message; (iii) unassigned—there are no matching rules. To help with topic assignment, emails whose topic assignments are only suggestions are preferably highlighted as such, so the user can review them and manually finalize assignments. For example, such highlighting could be a color such as grey. Along the way, the mail app may preferably sometimes suggest new or improved rules based on what the user does.

While the user is manually assigning incoming emails to topics, the user needs to see all of the incoming emails. The topic inclusion feature plays an important role here. As a practical matter, it may take time to transition to a new system of organization. Preferably, a compatible mail app lets the user make the transition at their own pace. Until the user adds rules for assigning topics, the mail app in certain embodiments will not assign any incoming emails to topics.

FIG. 14A shows what an embodiment of a mail viewer window 1401 may look like at each level of a topic tree. Mail apps that are compatible with topics preferably provide a topic column 1402 to indicate the topic assigned to each email message that is displayed. As seen in FIG. 14, the mail app's viewer window 1401 displays only messages relevant to the topic, be it the Home topic or some other topic. In the Mail in Home topic example at mail viewer window 1401.1, we see messages from all topics, including two messages near the bottom that are not assigned to any topic because they belong to the Home folder by default. In the Mail in CoDesign topic example at mail viewer window 1401.2 we see only emails assigned to the CoDesign topic and to topics that it contains (BlueSky, Smith, Thomas). In the Mail in BlueSky topic example at mail viewer window 1401.3 we see only emails assigned to the BlueSky topic. Topic bars 1404.1, 1404.2 and 1404.3 show the current topic.

Figure 14B:
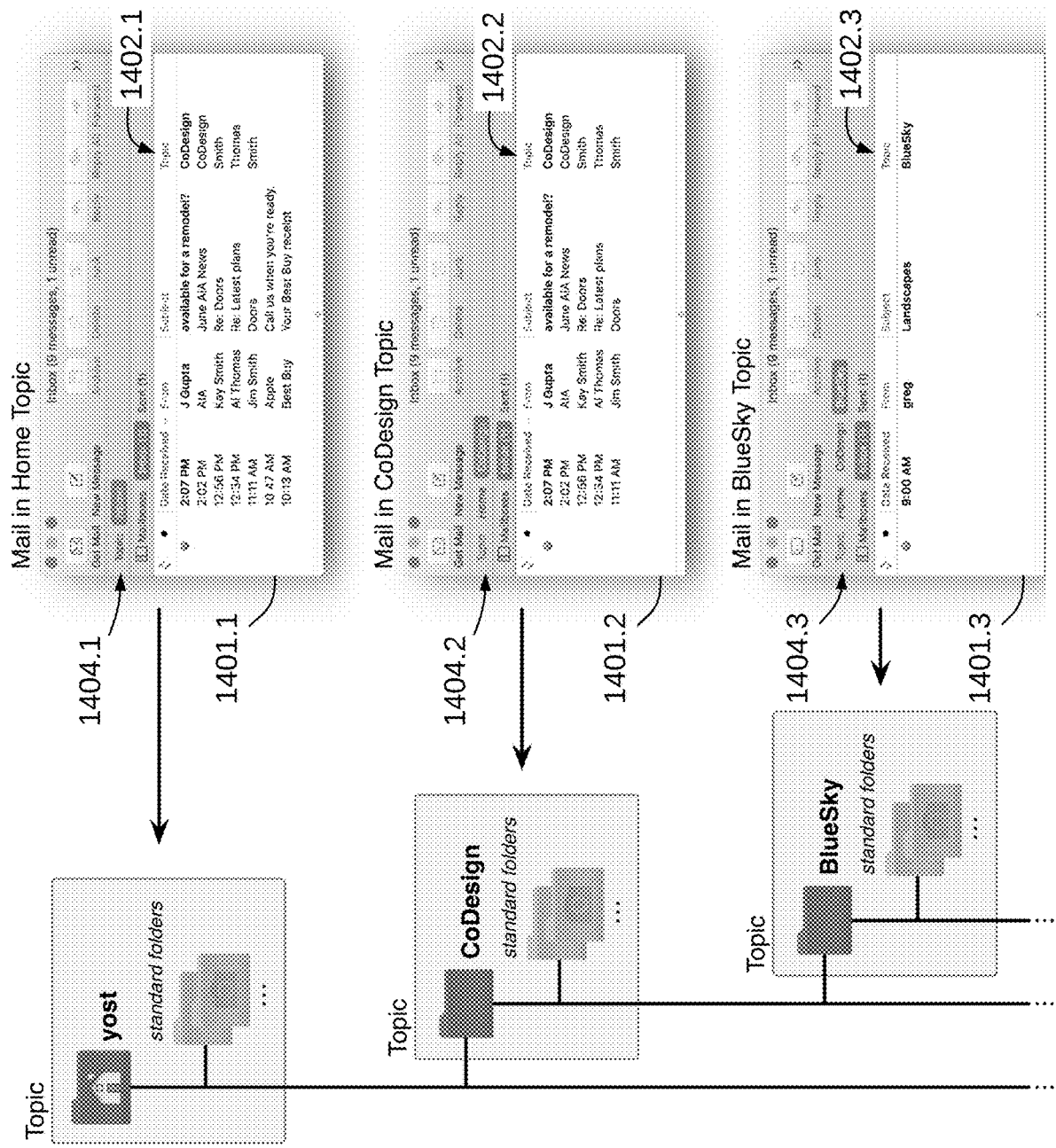

Turning to FIG. 14B, it can be seen by comparison against FIG. 14A that messages in a private topic are visible to a user only when the user's current topic is the private topic itself or when the current topic is a subtopic of the private topic. In FIG. 14B, for example, the user's BlueSky topic is private. The BlueSky topic's emails are visible when the private BlueSky topic is the current topic, as seen at 1402.3, but they are not visible in either the Home or the CoDesign topic when they are the current topic, as seen at 1402.1 and 1402.2 because those topics are neither the BlueSky topic nor subtopics of the BlueSky topic. In certain embodiments, the computer system 10.1 never hides a private topic from the user if the private topic is the user's current topic or is an ancestor topic of the user's current topic, and this holds true even if the user uses topic inclusion scope control to widen the topic scope; for example, if the BlueSky topic were marked private it would nevertheless be visible in FIGS. 15B and 15C (explained below), where the user is using topic inclusion scope control to widen the topic scope toward ancestors of the private topic while it is the current topic.

FIGS. 15A, 15B, 15C provide a user-interface-level overview of scope adjustment of topics in connection with email. The system responds to user input to select a set of topics from which to provide data to an application, whereby the application provides to the user a union of the trove data corresponding to the set of topics. It's useful to be able to have a quick look outside the scope of the current topic without having to switch the current topic to a different topic. For example, the user's current topic may be the BlueSky topic, and he may want to see all recent emails. The Topic bar 1404 permits quick access beyond the current topic. In the mail windows shown in FIGS. 15A, 15B, 15C, just below toolbar 1502, is Topic bar 1404, which contains the identifier "Topic:" to the left and provides scope buttons. Turning to FIG. 15A, the current topic where this mail window is viewed is the BlueSky topic, which is shown selected at the BlueSky topic scope button 1505.3. A single message is seen in the inbox, and its topic is the BlueSky topic as seen in the Topic column 1402.1. The user can click on Home or CoDesign in the Topic bar to widen the scope of the topics the user sees. If the user clicks on the topic scope button 1505.2 for the CoDesign topic, which as seen in FIG. 13 is the parent topic of the BlueSky topic, which is the current topic, the result, as seen in FIG. 15B is that the user has widened the scope of the messages displayed. The window shows all messages in the CoDesign topic plus a topics column 1402.2 calling out the topics of messages from all topics that CoDesign contains, such as the Smith, Thomas and BlueSky topics as would be shown if the user's current topic were the CoDesign topic. Next, the user clicks on the topic scope button 1505.1 for the Home topic in the Topic bar 1404. Recall from the description accompanying FIG. 13 that Home is the parent topic of the CoDesign topic. The result as shown in FIG. 15C, where the Home topic scope button 1505.1 is selected. This effect is that the user has further widened the scope of the messages displayed. The window shows all messages, as if the current topic were the Home topic.

Preferably, compatible apps show a Topic bar in any window that displays a collection of items belonging to topics. The items might be photos in a photos app or emails in a mail app viewer window or URLs in a browser history window. The user can sort items by topic and can select items and assign or copy them to the topic of the user's choice. If the user creates a new mail message while in a topic, the new email message will belong to the current topic, no matter what the Topic bar setting is. The Topic bar is just for setting the scope of topics the user can see.

In certain embodiments, the computer system 10 can allow for encrypting private topic data. In such embodiments, a topic folder is either encrypted and not in use or is decrypted and used within a distinct processing environment provided for the private topic. The computer system 10 responds to user input by encrypting data associated with a first topic, such as for example, topic A, to create encrypted first topic data for storage to the data storage. The computer system 10 responds to further user input by decrypting the encrypted first topic data to create a temporary unencrypted data set while the first topic is open. The computer system 10, while the first topic is open, creates a protected processing environment associated with the first topic, and provides restricted access to the temporary unencrypted data set for use by the protected processing environment associated with the first topic. As will be appreciated by those skilled in the art in view of the present disclosure, the protected processing environment may take the form of a process tree such as employed in derivatives of the Unix operating system or unused, temporary user ID and group ID, or folder storage in a separate volume not reachable by other processes.

Returning to the overall system, it can be seen that a computer system provides at least one isolated workspace as a user interface corresponding to a user-generated topic. Data storage stores application windows, files and application related data. A processor is coupled to the data storage and is configured to execute instructions that when executed cause the processor to provide a home topic to the user as a default topic corresponding to a first user account. The home topic provides a workspace to the user as a user interface, while the user is logged into the first user account. The home topic is designated by default as a current topic provided to the user. The processor further responds to user selection of a first topic other than the home topic, by, designating the first topic as the current topic provided to the user, associating a first isolated workspace with the first topic, generating for storage in the data storage, a first topic data structure associated with the first topic, associating with the first topic data structure, only application windows, files and application related data used by the user while the first topic is designated as the current topic. This provides to the user within the isolated first workspace, as the user interface, only application windows, files and application related data used by the user while the first topic is designated as the current topic.

An embodiment of the computer system disclosed herein provides a user interface that permits interaction with preferences corresponding to software executed by the computer system. A default preferences data structure comprising a plurality of default user preferences regarding certain of the software executed by the computer system is stored in data storage. Also stored in data storage is a user override preferences data structure comprising a plurality of user override preferences that differ from corresponding default user preferences. A processor is coupled to the data storage and is configured to execute instructions that cause the processor to accept a first user input to accept a user override preference to replace a default preference. The processor stores the user override preference to the user override preferences data structure and responds to user input to reveal the default user preference corresponding to the user override preference. The processor accepts a second user input to discard the user override preference by removing the user override preference from the user override preferences data structure. The processor may further execute instructions that cause the processor to respond to user input to reveal default user preferences that correspond to any user override preferences and accept one or more user inputs to discard any user override preferences by removing the user override preferences from the user override preferences data structure. The instruction that causes the processor to respond to user input to reveal the default user preference corresponding to the user override preference may further highlight the default user preference.

Figure 16:
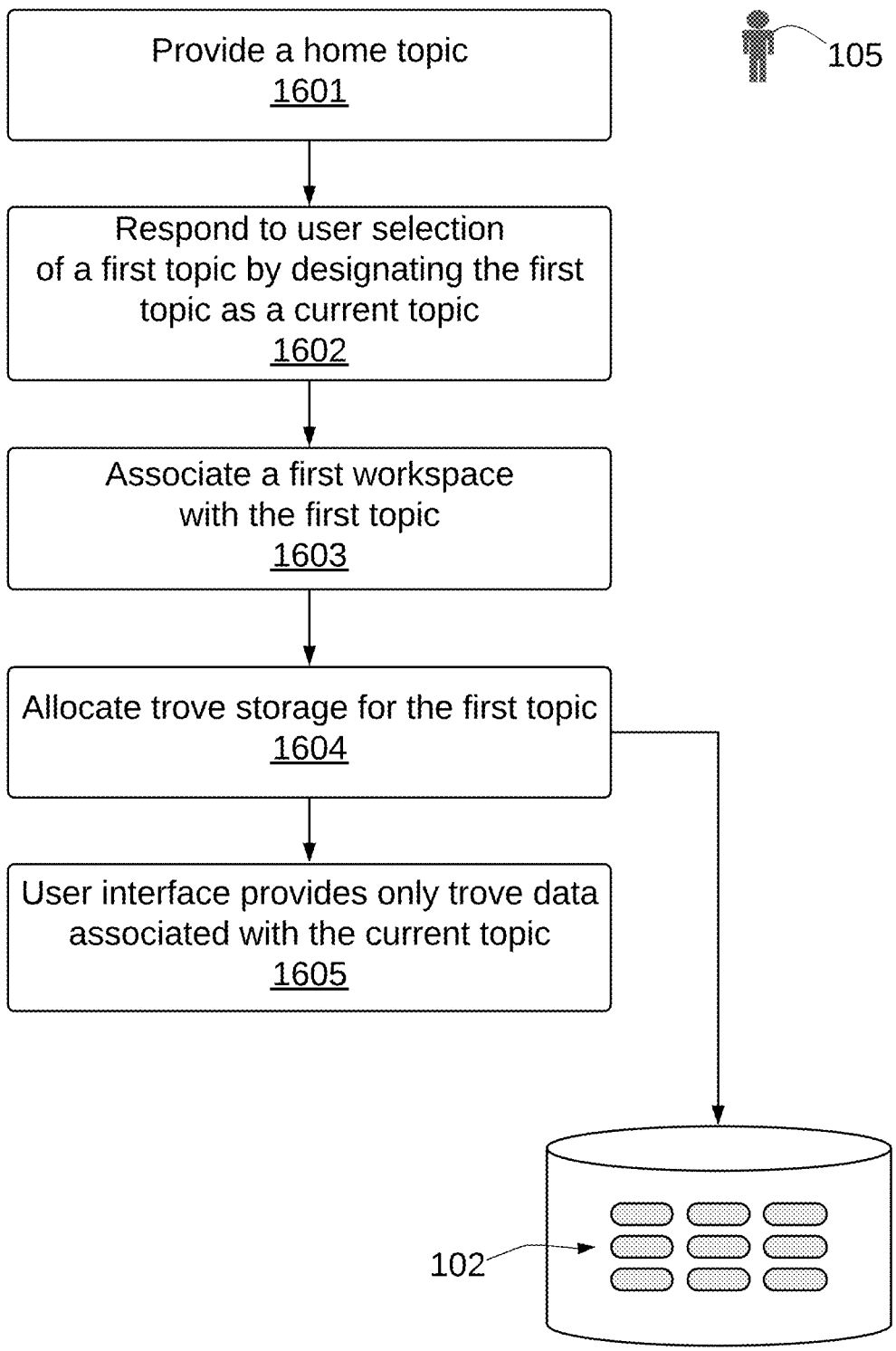
FIG. 16 is a flow diagram illustrating an overview of operation of an embodiment of a computer system implementing topics.

FIG. 16 is a flow diagram illustrating an overview of operation of an embodiment of a computer system implementing topics. Computer system 10 provides to user 105, a user interface that permits interaction with a first topic, generated by the user 105. The topic includes trove data and at least one associated workspace. Troves 102 are stored in data storage which is operatively coupled to a processor, which is configured to execute instructions that cause the processor to execute the operations shown in FIG. 16. The user, which the system associates with a first user account, is provided at 1601 with a home topic, initially selected as a current topic, and which corresponds to the first user account. The home topic associates a first home topic workspace to the user 105 as a user interface. The system 10 responds at 1602 to user selection of the first topic, different from the home topic, by designating the first topic as the current topic provided to the user 105. The system 10 also at 1603 associates a first workspace with the first topic. The system 10 further, at 1604, allocates trove storage for the first topic for applications used by the user 105 while the first topic is selected as the current topic. The system 10 provides to the user 105, at 1605, as the user interface of a workspace, only trove data associated with the current topic.

The embodiments herein can be implemented in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The terms "computer system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

Figure 17:
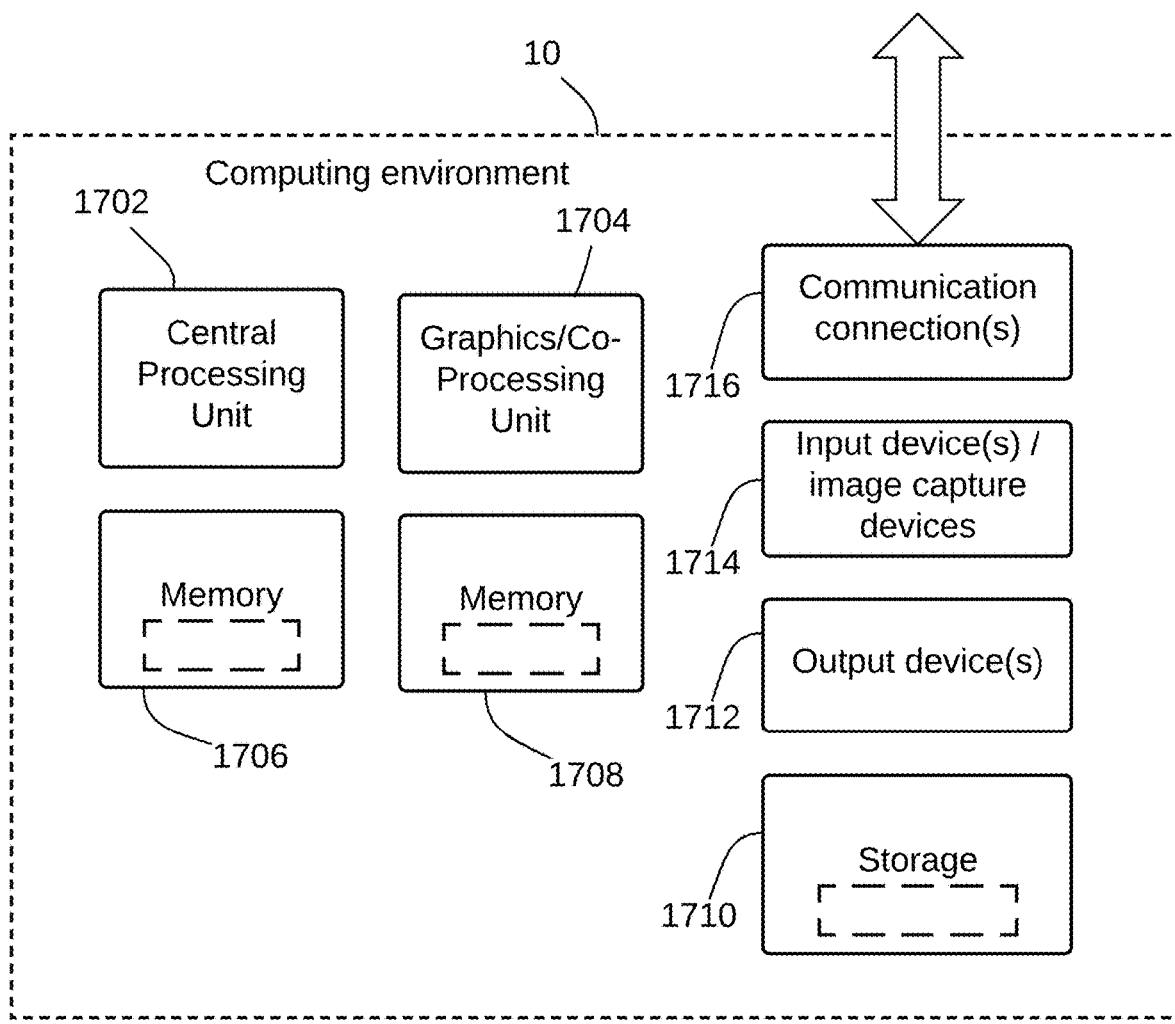
FIG. 17 is a block diagram of computer hardware that may be employed in certain embodiments of computer systems described herein.

FIG. 17 depicts a generalized example of a suitable general-purpose computing system 10, such as computer system 10.1 and/or computer system 10.2 in which the described innovations may be implemented in order to improve the processing speed and efficiency with which the computing system 10 operates to perform the functions disclosed herein. With reference to FIG. 17 the computing system 10 includes one or more processing units 1702, 1704 and memory 1706, 1708. The processing units 1702, 1704 execute computer-executable instructions. A processing unit can be a general-purpose central processing unit (CPU), processor in an application-specific integrated circuit (ASIC) or any other type of processor. The tangible memory 1706, 1708 may be volatile memory (e.g., registers, cache, RAM), non-volatile memory (e.g., ROM, EEPROM, flash memory, etc.), or some combination of the two, accessible by the processing unit(s). The hardware components in FIG. 17 may be standard hardware components, or alternatively, some embodiments may employ specialized hardware components to further increase the operating efficiency and speed with which the computer system 10.1 operates. The various components of computer system 10 may be rearranged in various embodiments, and some embodiments may not require nor include all of the above components, while other embodiments may include additional components, such as specialized processors and additional memory.

Computing system 10 may have additional features such as for example, storage 1710, one or more input devices 1714, one or more output devices 1712, and one or more communication connections 1716. An interconnection mechanism (not shown) such as a bus, controller, or network interconnects the components of the computing system 10. Typically, operating system software (not shown) provides an operating system for other software executing in the computing system 10, and coordinates activities of the components of the computing system 10.

The tangible storage 1710 may be removable or non-removable, and includes flash memory, magnetic disks, magnetic tapes or cassettes, CD-ROMs, DVDs, nonvolatile random-access memory, or any other medium that can be used to store information in a non-transitory way and that can be accessed within the computing system 10. The storage 1710 stores instructions for the software implementing one or more innovations described herein.

The input device(s) 1714 may be a touch input device such as a keyboard, mouse, pen, or trackball, a voice input device, a scanning device, or another device that provides input to the computing system 10. For video encoding, the input device(s) 1714 may be a camera, video card, TV tuner card, or similar device that accepts video input in analog or digital form, or a CD-ROM or CD-RW that reads video samples into the computing system 10. The output device(s) 1712 may be a monitor, printer, speaker, CD-writer, or another device that provides output from the computing system 10.

The communication connection(s) 1716 enable communication over a communication medium to another computing entity (such as between computer system 10.1 and computer system 10.2). The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

It should be understood that functions/operations shown in this disclosure are provided for purposes of explanation of operations of certain embodiments. The implementation of the functions/operations performed by any particular module may be distributed across one or more systems and computer programs and are not necessarily contained within a particular computer program and/or computer system.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer system with an operating system that provides user access through a user account, each user account configurable by an associated user to provide a plurality of user work environments, each of the user work environments called a topic, and the plurality of user work environments comprising at least a first topic and a second topic, each topic providing one or more troves associated with user activity while the topic is selected as the user's current topic, the computer system providing a user interface that permits interaction with the second topic, generated by a user, that includes at least one associated workspace, the system comprising:
    data storage, operatively coupled to a processor, for storing trove data in one or more troves, each trove associated with an application executing while the user has selected the second topic as the current topic;
    the processor configured to execute instructions that cause the processor to:
        provide to the user of a first user account, the first topic, initially selected as a current topic corresponding to the first user account, wherein the first topic associates a first topic current workspace to the user as a user interface;
        respond to user selection of the second topic, different from the first topic, by,
            designating the second topic as the current topic provided to the user;
            associating a second topic current workspace with the second topic; and
            allocating a trove per application used by the user while the second topic is selected as the current topic; and
        respond to an external event to offer to the user an option to provide user input to switch to a different topic from the current topic in order to respond to the external event from the different topic.

2. The computer system of claim 1 wherein the instructions that cause the processor to respond to an external event comprise instructions that cause the processor to:
    receive, from an operating system executing on the processor, a change in user behavior and respond to offer to the user an option to provide user input to switch to a different topic from the current topic in order to respond to the external event from the different topic.

3. The computer system of claim 1 wherein the instructions that cause the processor to respond to an external event comprise instructions that cause the processor to:
    respond to an input by the user to select a change of focus, to offer to the user an option to provide user input to switch to a different topic from the current topic in order to respond to the external event from the different topic.

4. The computer system of claim 1 wherein the instructions that cause the processor to respond to an external event comprise instructions that cause the processor to:
    accept from the user an input to select a focus area for work by the user by offering to the user an option to provide user input to switch to a different topic from the current topic in order to respond to the external event from the different topic.

* * * * *